US012800852B2

(12) United States Patent
Toda

(10) Patent No.: US 12,800,852 B2
(45) Date of Patent: Nov. 17, 2026

(54) SUBSTRATE TYPE OPTICAL WAVEGUIDE ELEMENT AND OPTICAL COMMUNICATION APPARATUS

(71) Applicant: FUJITSU OPTICAL COMPONENTS LIMITED, Kawasaki (JP)

(72) Inventor: Hoshihiko Toda, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 533 days.

(21) Appl. No.: 18/370,638

(22) Filed: Sep. 20, 2023

(65) Prior Publication Data

US 2024/0134133 A1 Apr. 25, 2024
US 2024/0231015 A9 Jul. 11, 2024

(30) Foreign Application Priority Data

Oct. 24, 2022 (JP) ................................ 2022-169702

(51) Int. Cl.
*G02B 6/42* (2006.01)

(52) U.S. Cl.
CPC .................................. *G02B 6/4203* (2013.01)

(58) Field of Classification Search
CPC .................................................. G02B 6/4203
USPC ........................................................... 385/32
See application file for complete search history.

(56) References Cited

U.S. PATENT DOCUMENTS

| | | | | |
|---|---|---|---|---|
| 2010/0158443 | A1* | 6/2010 | Jeong | G02B 6/14 29/829 |
| 2017/0003451 | A1* | 1/2017 | Ma | G02B 6/126 |
| 2017/0090118 | A1 | 3/2017 | Sodagar et al. | |
| 2020/0166702 | A1 | 5/2020 | Jacob et al. | |
| 2022/0283367 | A1 | 9/2022 | Thomas et al. | |
| 2023/0056455 | A1* | 2/2023 | Oka | G02B 6/125 |

FOREIGN PATENT DOCUMENTS

| | | | |
|---|---|---|---|
| JP | 2004-145184 | A | 5/2004 |
| JP | 2016-18894 | | 2/2016 |
| JP | 2017-215526 | A | 12/2017 |
| WO | WO 2016/166971 | A1 | 10/2016 |

OTHER PUBLICATIONS

Japanese Office Action dated Apr. 28, 2026 for Japanese Application No. 2022-169702.

* cited by examiner

*Primary Examiner* — Jerry M Blevins
(74) *Attorney, Agent, or Firm* — STAAS & HALSEY LLP

(57) ABSTRACT

A substrate type optical waveguide element includes a bent waveguide that guides a basic mode, that converts an unneeded mode other than the basic mode to a slab mode, and that is a rib type. Furthermore, the substrate type optical waveguide element includes a removing portion that is arranged at an outer circumferential portion of the bent waveguide, and that removes, from the bent waveguide, the slab mode converted in the bent waveguide.

16 Claims, 24 Drawing Sheets

(AT TIME OF INPUT OF TE1 MODE)

FIG.5

| | TE1 LOSS | WAVEGUIDE LENGTH | CALCULATION CONDITION |
|---|---|---|---|
| FIRST EMBODIMENT | 37 dB | **39 um** | WAVELENGTH: 1.55 um, NO MANUFACTURING ERROR, SLAB THICKNESS: 90 nm, CORE THICKNESS: 220 nm |
| CONVENTIONAL TECHNOLOGY | 37 dB | 248 um | WAVELENGTH: 1.55 um, NO MANUFACTURING ERROR, SLAB THICKNESS: 150 nm, CORE THICKNESS: 220 nm |

SUBSTRATE TYPE OPTICAL WAVEGUIDE ELEMENT AND OPTICAL COMMUNICATION APPARATUS

CROSS-REFERENCE TO RELATED APPLICATION

This application is based upon and claims the benefit of priority of the prior Japanese Patent Application No. 2022-169702, filed on Oct. 24, 2022, the entire contents of which are incorporated herein by reference.

FIELD

The embodiments discussed herein are related to a substrate type optical waveguide element and an optical communication apparatus.

BACKGROUND

In recent years, with the spread of a moving image distribution service and the like, data communication charges are on the rise, so that there is a demand for higher-capacity network communication. Accordingly, silicon photonics (SiPh) is drawing attention in terms of the capability of high-density integration. In a photonic integrated circuit (PIC) using silicon photonics (SiPh), the basic mode that is the lowest order mode of a waveguide mode is mainly used for communication. As the basic mode of an optical waveguide, for example, there are a TE0 mode for transverse electric (TE) polarization and a TM0 mode for transverse magnetic (TM) polarization. An x-th order mode of TE other than the basic mode (TE0) for TE polarization is denoted by TEx, whereas an x-th order mode for TM other than the basic mode (TM0) for TM polarization is denoted by TMx.

In addition, in SiPh, a propagation loss of the optical waveguide is high, so that a method of decreasing the propagation loss in the optical waveguide by increasing the waveguide width of the optical waveguide is generally used. However, if the waveguide width is increased, a higher-order mode that is a mode other than the basic mode, that is, for example, a TE1 mode, is also propagated to the optical waveguide.

For example, in the case where modes propagating through a channel type optical waveguide with a waveguide width of 500 nm and a waveguide thickness of 220 nm are three modes that are, for example, TE0, TE1, and TM0, and TE0 is used as the main signal, TE1 and TM0 are the modes that are originally unneeded for communication; therefore, these modes are referred to as an unneeded mode.

Accordingly, in the case where an unneeded mode is input to the interior of a substrate type optical waveguide element together with the main signal, the unneeded mode is accordingly converted to the main signal as a result of mode conversion or the like performed in the substrate type optical waveguide element. Consequently, an operation that is not intended by the substrate type optical waveguide element occurs caused by the converted main signal.

A waveguide structure exhibits a discontinuous state in, for example, a waveguide provided in a multi-mode interference (MMI) or in, for example, a waveguide that is located between a straight line waveguide and a circular arc waveguide, and thus, the mode conversion occurs at portions before and after the connection point in which electric field distributions of the propagation mode exhibits the discontinuous state in the traveling direction of light. If this mode conversion occurs, in the case where TE1 propagates together with TE0, TE1 is converted to TE0. TE0 that is the main signal and TE0 that has been converted from TE1 and that is the higher-order mode interfere with each other, and thus wavelength ripples are generated, which is not an intended operation. Accordingly, in the case where the substrate type optical waveguide element is to be operated as intended, there is a need to constitute a structure for removing the unneeded mode.

In addition, an example of the substrate type optical waveguide element that is affected by the unneeded mode includes a 1×2 coupler. FIG. 27 is a diagram illustrating one example of a 1×2 coupler 100 that is conventionally used, and FIG. 28 is a diagram illustrating one example of a relationship between a mixed amount of the TE1 mode and a branching ratio of a 1×2 coupler. In the 1×2 coupler 100 illustrated in FIG. 27, if an unneeded mode TE1 is input from the one input side in addition to TE0 that is the main signal, TE0 and TE1 interfere with each other, the branching ratio is changed in accordance with a mixed amount ε of the unneeded mode TE1. As illustrated FIG. 28, the branching ratio is gradually increased in accordance with an increase in the mixed amount ε of the unneeded mode TE1. If this type of the 1×2 coupler 100 is used for a Mach-Zehnder Modulator (MZM), a variation in the branching ratio causes degradation or the like of an extinction ratio, which leads to degradation of signal quality of, for example, a transmitter.

In addition, in also the case where TE0 that is the main signal and the unneeded mode TE1 are input from the two input sides of the 1×2 coupler 100, the branching ratio is accordingly changed as a result of these input TE0 and TE1 interfering with each other. Regarding this type of problem, a similar event occurs in also a case of, for example, a 2×2 coupler.

In addition, an example of a device that is affected by the unneeded mode includes a tapered waveguide in which the waveguide width is gradually increased from an input side to an output side. FIG. 29 is a schematic plan view illustrating one example of a tapered waveguide 110 that is conventionally used, and FIG. 30 is a diagram illustrating one example of a schematic cross-sectional portion taken along line B-B illustrated in FIG. 29. At an input portion 111 and an output portion 112 of the tapered waveguide 110 illustrated in FIG. 29, the magnitude of the effective refractive index of each of TE1 and TM0 is inverted, and, in addition, a portion between the input portion 111 and the output portion 112 has a vertically asymmetric refractive index distribution in cross section. The tapered waveguide 110 is a channel waveguide.

The tapered waveguide 110 illustrated in FIG. 30 includes a box layer 115B made of $SiO_2$, a core 113 with a channel type arranged on the box layer 115B, and a clad layer 115A that is made of $SiO_2$ and that is laminated on the box layer 115B and the core 113. In the tapered waveguide 110, in the case where, for example, TE1 is input from the input portion 111, TM0 is output from the output portion 112 as a result of TE1 being converted to TM0.

In addition, as a method for decreasing a propagation loss of an optical waveguide, there is a known method for increasing the waveguide width. However, a tapered waveguide is used when the waveguide width is increased, and, if TE1 and TM0 are input to the tapered waveguide, some of TE1 and TM0 are converted into TM0 and TE1 as mode conversion, so that crosstalk occurs in an optical transmitter that performs polarization division multiplexing transmission, which leads to degradation of the signal quality. Furthermore, here, the waveguide with a channel type is used as an example; however, a similar event occurs in a waveguide with a rib type. Therefore, there is a demand for a method for removing the unneeded mode that is present in a waveguide.

As a method for removing the unneeded mode, there is a known method for performing, in a rib type waveguide, a doping process on a slab of the rib type waveguide and removing an unneeded mode by light absorption of the doped slab. FIG. 31 is a schematic cross-sectional diagram illustrating one example of a rib type waveguide 120 that is conventionally used. The rib type waveguide 120 illustrated in FIG. 31 includes a box layer 123B, a rib 121 and a slab 122 that are arranged on the box layer 123B, and a clad layer 123A that is laminated on the rib 121, the slab 122, and the box layer 123B. The slab 122 is subjected to the doping process, it is possible to remove the unneeded mode by light absorption of the slab 122.

Patent Document 1: U.S. Publication No. 2020/0166702

Patent Document 2: U.S. Publication No. 2017/0090118

Patent Document 3: Japanese Laid-open Patent Publication No. 2017-215526

Patent Document 4: Japanese Laid-open Patent Publication No. 2004-145184

However, in the rib type waveguide 120 that is conventionally used, a loss in the TE1 mode is 148 dB/mm, so that, in order to obtain the removal effect of the TE1 mode by adding an optical loss of 30 dB, a length of about 200 um is needed for the waveguide length of the rib type waveguide 120. Consequently, the size of the substrate type optical waveguide element itself is accordingly increased.

In the rib type waveguide 120 that is conventionally used, if the waveguide width is increased in order to decrease a propagation loss of the basic mode, an amount of light leaking into the slab 122 is decreased even in a case of the same mode, and thus the removal effect of the unneeded mode is decreased. Consequently, there is a need to increase the waveguide length, and the effect of increasing the waveguide width performed to obtain a low loss is canceled out, which leads to an increase in the propagation loss of the basic mode.

SUMMARY

According to an aspect of an embodiment, a substrate type optical waveguide element includes a bent waveguide and a removing portion. The bent waveguide guides a basic mode, converts an unneeded mode other than the basic mode to a slab mode, and is a rib type. The removing portion is arranged at an outer circumferential portion of the bent waveguide and removes, from the bent waveguide, the slab mode converted in the bent waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a comparative example between the substrate type optical waveguide element according to the first embodiment and a substrate type optical waveguide element that is conventionally used;

Figure 17:
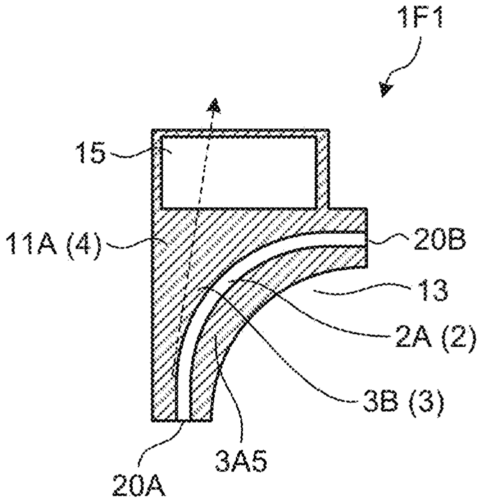
Figure 18:
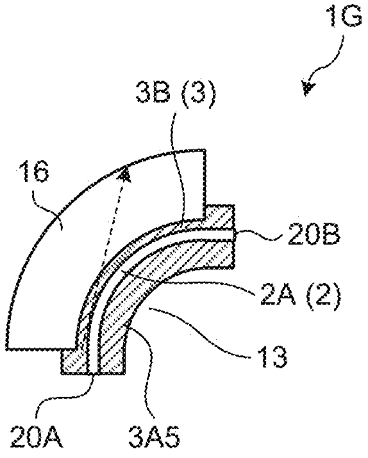
Figure 19:
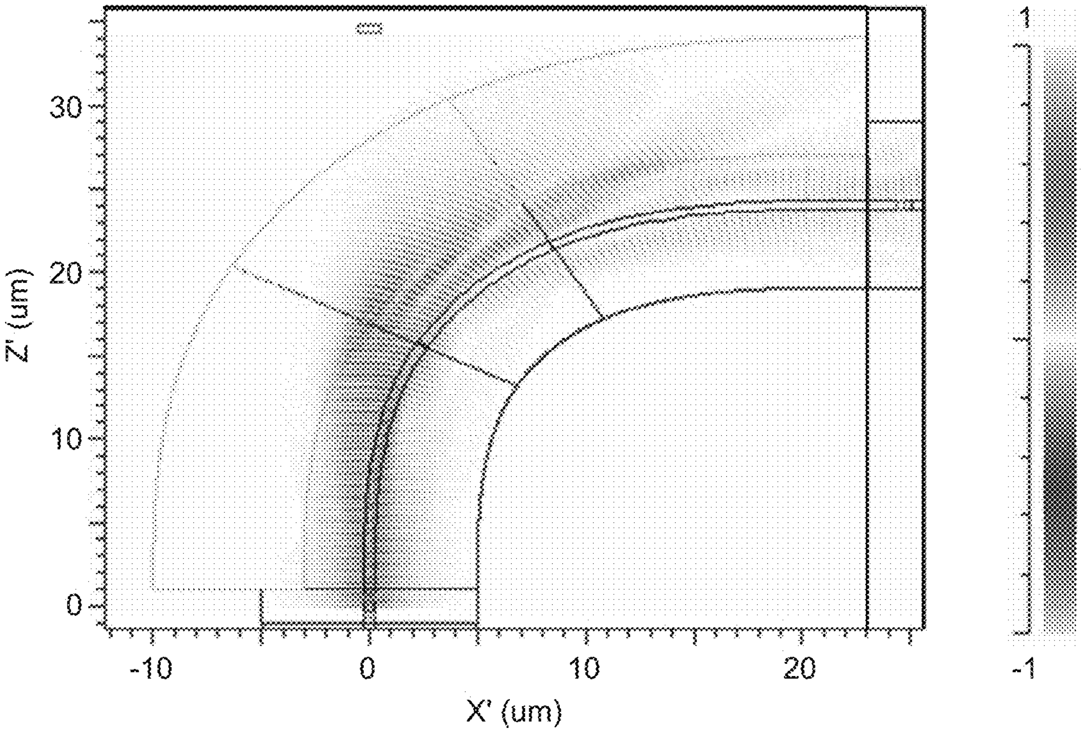
Figure 20A:
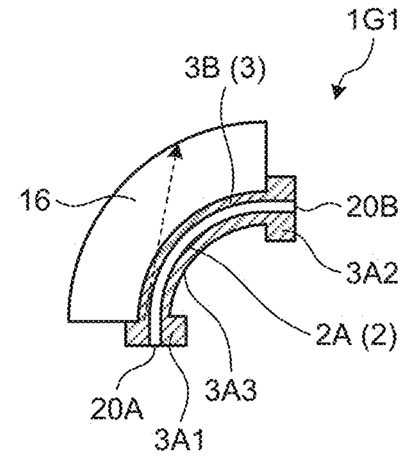
Figure 20B:
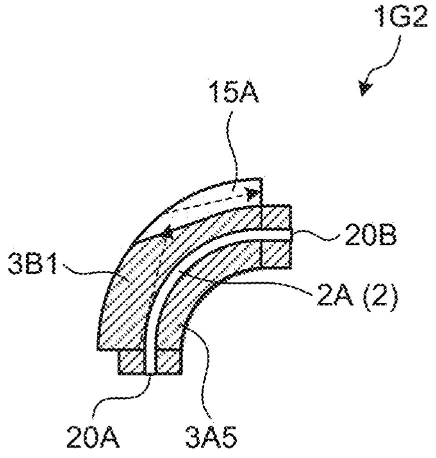
Figure 20C:
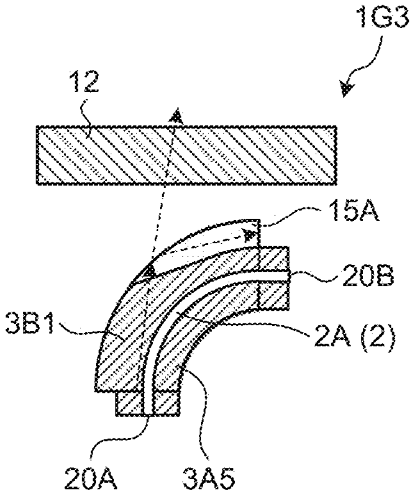
Figure 21:
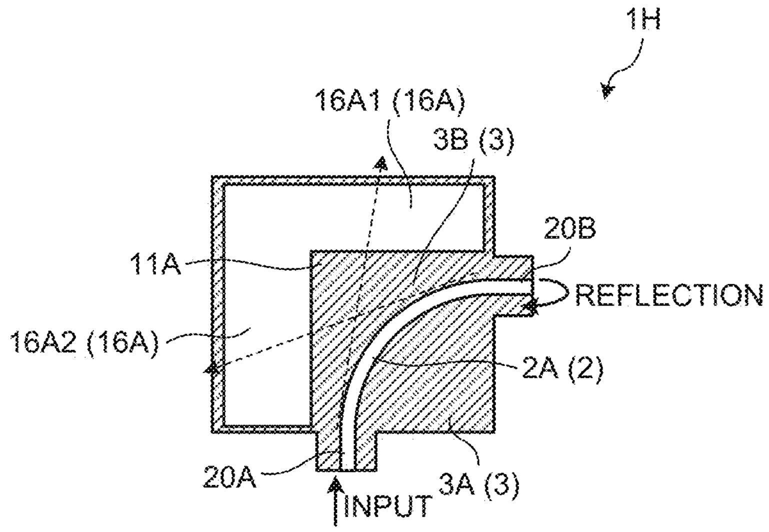
Figure 22:
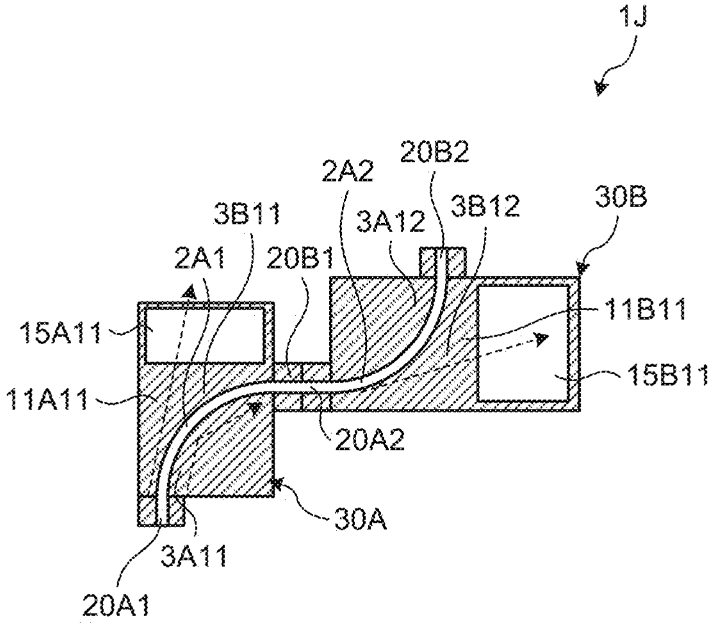
Figure 23:
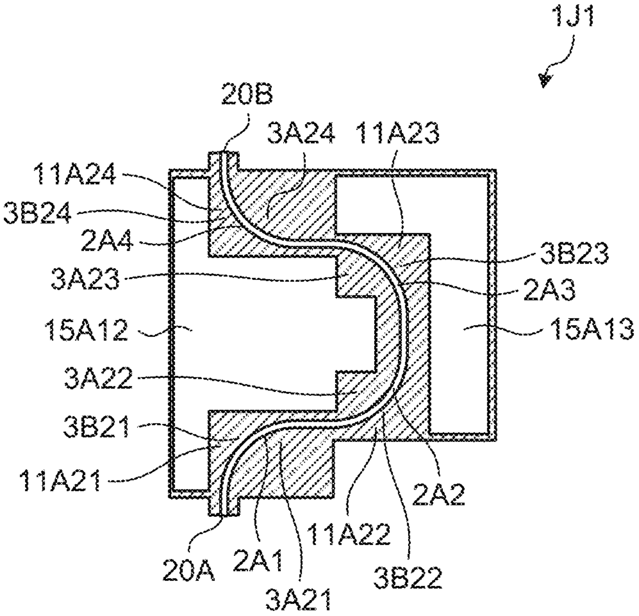
Figure 24:
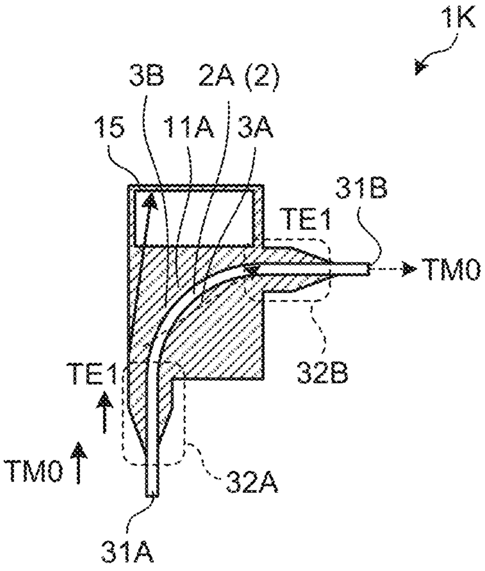
Figure 25A:
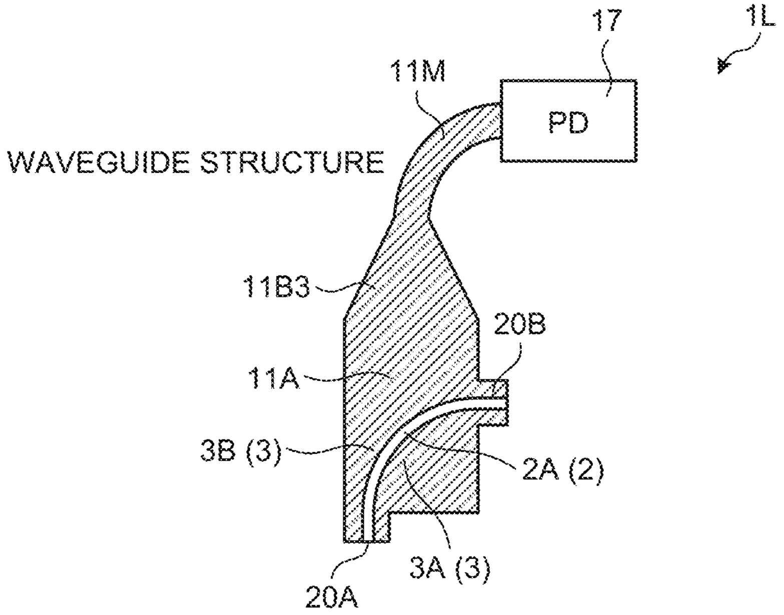
Figure 25B:
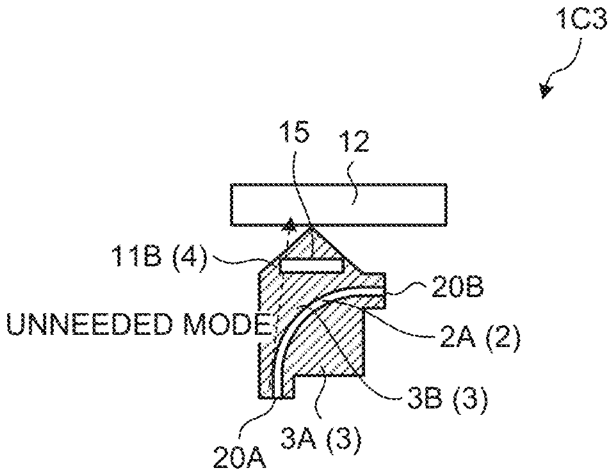
Figure 26:
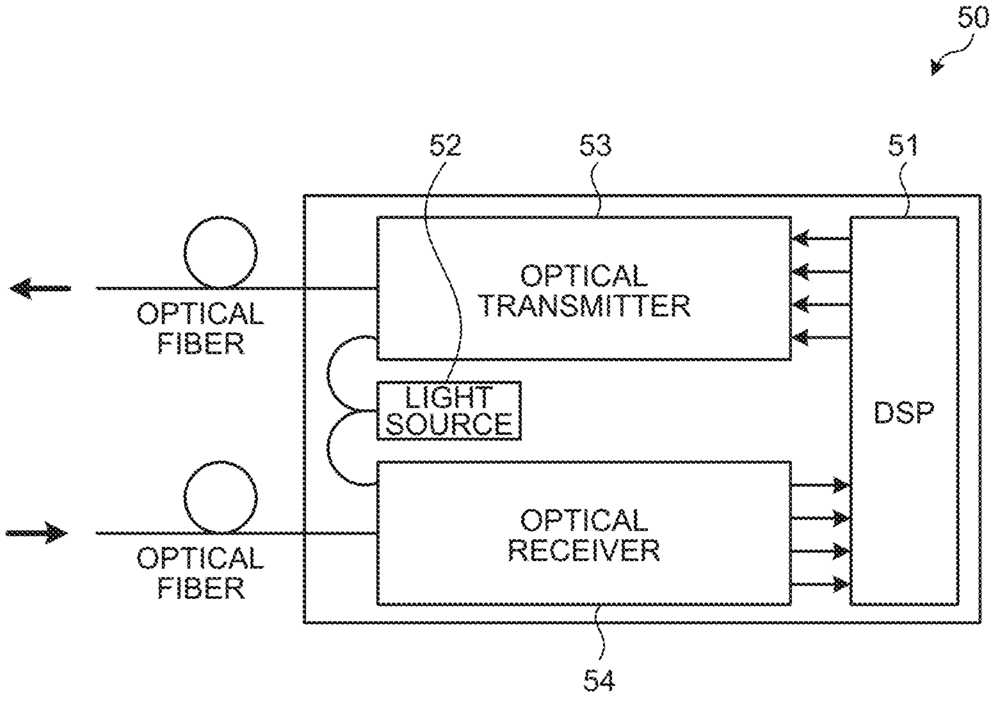
Figure 27:
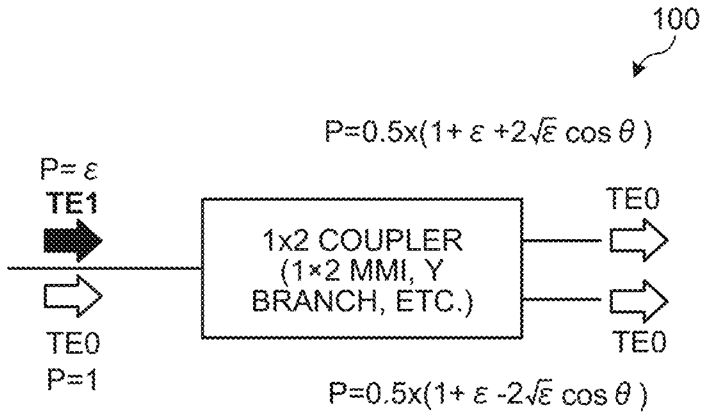
Figure 28:
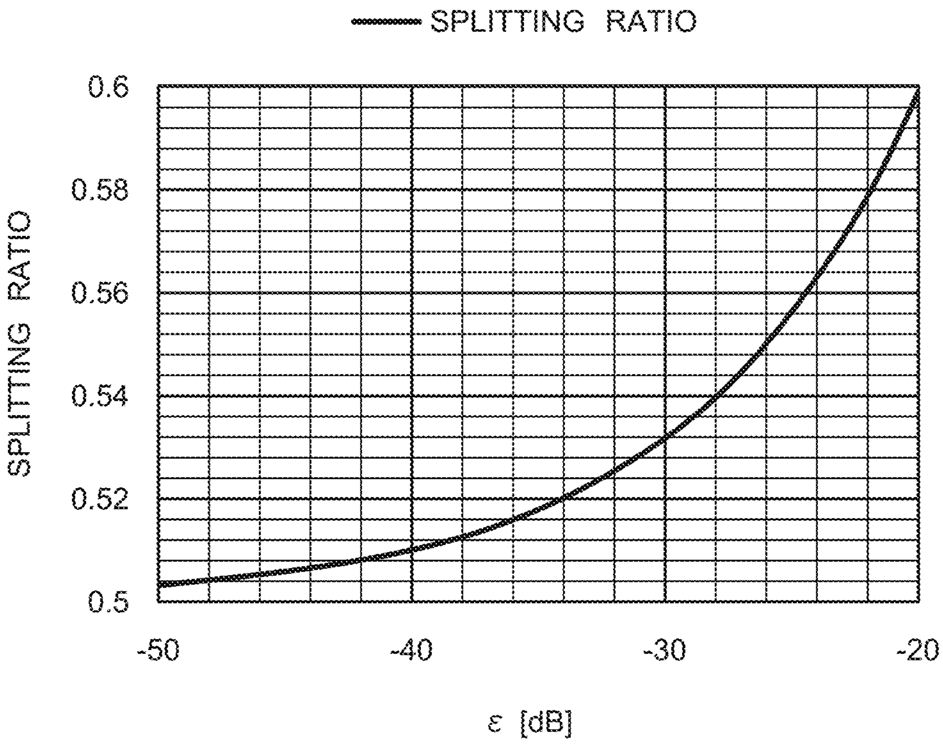
Figure 29:
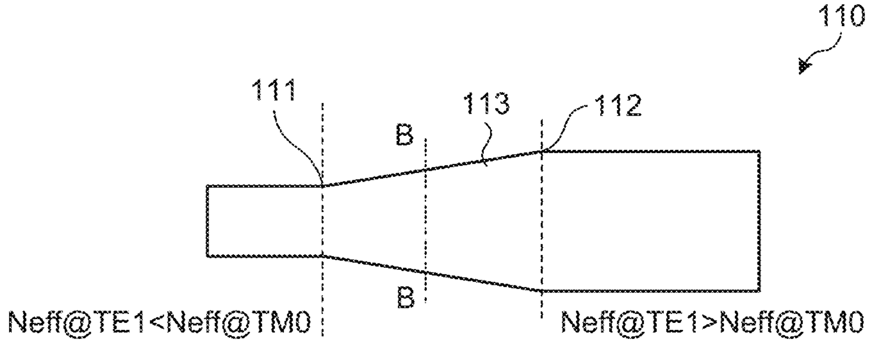
Figure 30:
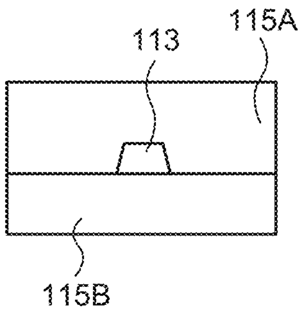
Figure 31:
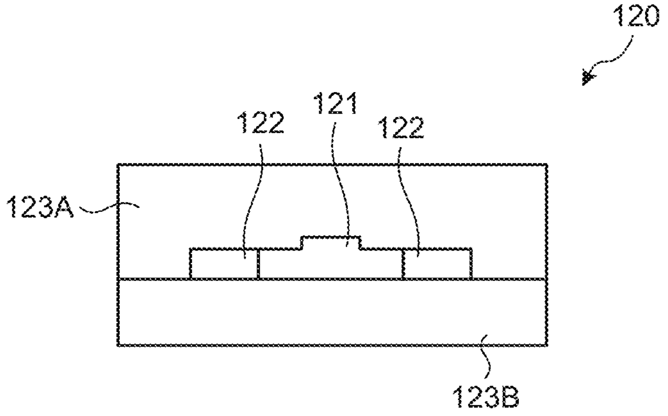

FIG. 17 is a schematic plan view illustrating one example of a configuration of a substrate type optical waveguide element according to another form of the sixth embodiment;

FIG. 18 is a schematic plan view illustrating one example of a configuration of a substrate type optical waveguide element according to a seventh embodiment;

FIG. 19 is a diagram illustrating one example of an electric field distribution at the time of an input of a TE1 mode in the substrate type optical waveguide element obtained in the case where a bent absorber is present;

FIG. 20A is a schematic plan view illustrating one example of a configuration of a substrate type optical waveguide element according to another form of the seventh embodiment;

FIG. 20B is a schematic plan view illustrating one example of a configuration of a substrate type optical waveguide element according to another form of the seventh embodiment;

FIG. 20C is a schematic plan view illustrating one example of a configuration of a substrate type optical waveguide element according to another form of the seventh embodiment;

FIG. 21 is a schematic plan view illustrating one example of a configuration of a substrate type optical waveguide element according to an eighth embodiment;

FIG. 22 is a schematic plan view illustrating one example of a configuration of a substrate type optical waveguide element according to a ninth embodiment;

FIG. 23 is a schematic plan view illustrating one example of a configuration of a substrate type optical waveguide element according to another form of the ninth embodiment;

FIG. 24 is a schematic plan view illustrating one example of a configuration of a substrate type optical waveguide element according to a tenth embodiment;

FIG. 25A is a schematic plan view illustrating one example of a configuration of a substrate type optical waveguide element according to an eleventh embodiment;

FIG. 25B is a schematic plan view illustrating one example of a configuration of a substrate type optical waveguide element according to another form;

FIG. 26 is a diagram illustrating one example of an optical communication apparatus that includes a substrate type optical waveguide element as a built-in element according to the present embodiment;

FIG. 27 is a diagram illustrating one example of a 1×2 coupler that is conventionally used;

FIG. 28 is a diagram illustrating one example of a relationship between a mixed amount of the TE1 mode and a branching ratio of the 1×2 coupler;

FIG. 29 is a schematic plan view illustrating one example of a tapered waveguide that is conventionally used;

FIG. 30 is a diagram illustrating one example of a schematic cross-sectional portion taken along line B-B illustrated in FIG. 29; and FIG. 31 is a schematic cross-sectional diagram illustrating one example of a rib type waveguide that is conventionally used.

DESCRIPTION OF EMBODIMENTS

Preferred embodiments of the present invention will be explained with reference to accompanying drawings. Furthermore, the present invention is not limited to the embodiments. In addition, each of the embodiments may be used in any appropriate combination as long as they do not conflict with each other.

(a) First Embodiment

Figure 1:
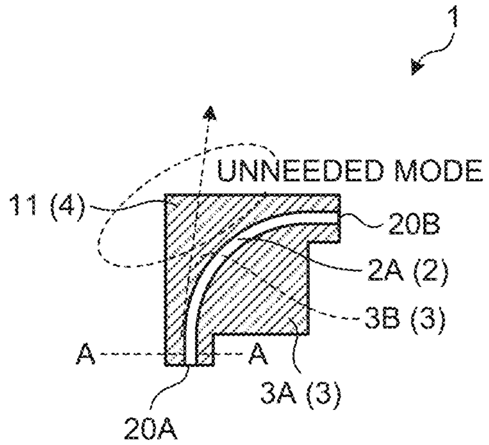
FIG. 1 is a schematic plan view illustrating one example of a configuration of a substrate type optical waveguide element according to a first embodiment.
Figure 2:
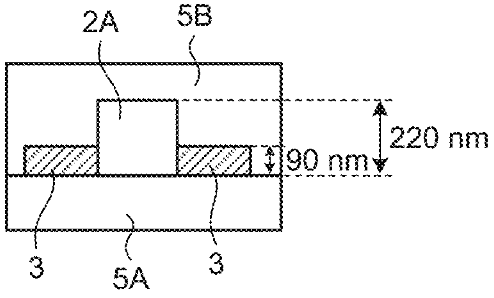
FIG. 2 is a diagram illustrating one example of a schematic cross-sectional portion taken along line A-A illustrated in FIG. 1.

FIG. 1 is a schematic plan view illustrating one example of a configuration of a substrate type optical waveguide element 1 according to a first embodiment, and FIG. 2 is a diagram illustrating one example of a schematic cross-sectional portion taken along line A-A illustrated in FIG. 1. The substrate type optical waveguide element 1 illustrated in FIG. 1 includes a bent waveguide 2 having a rib type, and an excess slab 11 that has a wide width and that is arranged at an outer circumferential portion of the bent waveguide 2. The bent waveguide 2 having the rib type guides a basic mode and converts an unneeded mode other than the basic mode to a slab mode. In addition, for convenience of description, in the case where the modes that guide the bent waveguide 2 are denoted by TE0 and TE1, and in the case where the main signal mode is denoted by TE0, the unneeded mode is denoted by TE1. The excess slab 11 is arranged at the outer circumferential portion of the bent waveguide 2, and the slab mode that has been converted in the bent waveguide 2 is optically transitioned from the bent waveguide 2, so that the excess slab 11 also has a function for serving as a removing portion that removes the unneeded mode from the bent waveguide 2.

The bent waveguide 2 having the rib type illustrated in FIG. 2 is a bent waveguide that has an asymmetric rib type waveguide structure and that includes a box layer 5A, a rib 2A and a slab 3 that are arranged on the box layer 5A, and a clad layer 5B that is laminated on the rib 2A, the slab 3, and the box layer 5A. The rib thickness of the rib 2A is thicker than the slab thickness of the slab 3, and is, for example, 220 nm, whereas the slab thickness is, for example, 90 nm. The bent waveguide 2 is an optical waveguide having a rib type that guides the signal light from an input portion 20A to an output portion 20B. The bent waveguide 2 mainly converts a mode other than the basic mode to the slab mode. In addition, in the main signal mode, an electric field is concentrated at the rib 2A included in the bent waveguide 2, whereas, in the higher-order mode, an electric field is concentrated at the slab 3 included in the bent waveguide 2. The higher-order mode in which the electric field is concentrated at the slab 3 is referred to as the slab mode.

The slab 3 included in the bent waveguide 2 includes an inner part slab 3A that is arranged at an inner circumferential portion of the rib 2A, and an outer side slab 3B that is arranged at an outer circumferential portion of the rib 2A. The excess slab 11 is a slab constituted to have a slab width that is larger than that of the outer side slab 3B of a common rib type waveguide.

The excess slab 11 is a removing portion 4 that removes the unneeded mode from the bent waveguide 2 by causing the slab mode that has been converted in the bent waveguide 2 to propagate through the excess slab 11.

For example, in the mode that is included in the unneeded mode and in which an electric field is concentrated at the rib 2A, that is, for example, in TE1, confinement of light is weaker than that in the basic mode. Accordingly, in the bent waveguide 2 that is constituted to have a sharp bent structure, TE1 is not able to be confined in the rib 2A, and thus, TE1 is converted to the slab mode (a mode of further higher order that propagates the slab). In other words, in the bent waveguide 2, the unneeded mode TE1 that is present in the rib 2A is converted to the slab mode.

Figure 3A:
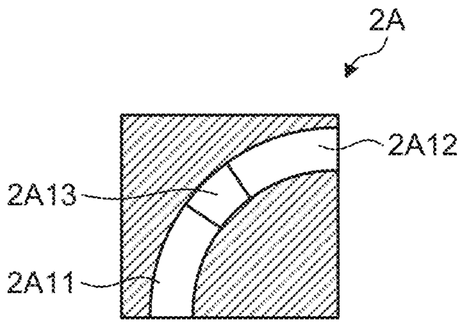
FIG. 3A is a diagram illustrating one example of a configuration of a bent waveguide.

FIG. 3A is a diagram illustrating one example of a configuration of the bent waveguide 2. The bent waveguide 2 illustrated in FIG. 3A includes a first curve waveguide 2A11 that is parallel to a first clothoid curve, a second curve waveguide 2A12 that is parallel to a second clothoid curve, and a third curve waveguide 2A13 that is parallel to a circular arc. The bent waveguide 2 is constituted by connecting a portion between the first curve waveguide 2A11 and the second curve waveguide 2A12 by using the third curve waveguide 2A13. In other words, the bent waveguide 2 is an optical waveguide that is parallel to an easement curve that has the curvature that varies continuously, and that is a rib type.

Figure 3B:
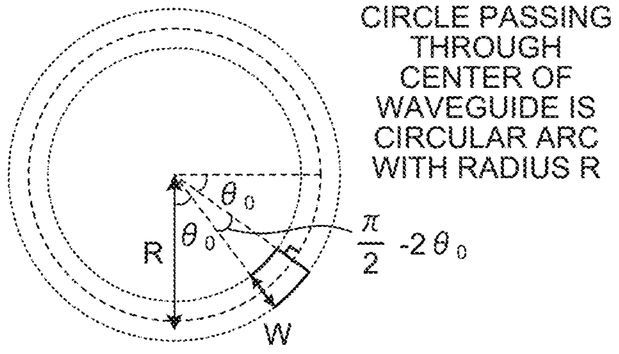
FIG. 3B is a diagram illustrating one example of a third curve waveguide included in the bent waveguide.

FIG. 3B is a diagram illustrating one example of the third curve waveguide 2A13 included in the bent waveguide 2. The third curve waveguide 2A13 is a curve waveguide having a circular arc illustrated in FIG. 3B. The third curve waveguide 2A13 is the curve waveguide that has a rib type constituted such that a circle passing through the center of the waveguide is parallel to a circular arc of a radius R.

Figure 3C:
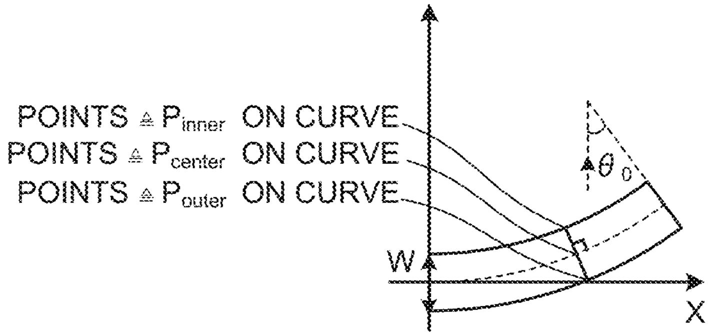
FIG. 3C is a diagram illustrating one example of a first curve waveguide and a second curve waveguide included in the bent waveguide.

FIG. 3C is a diagram illustrating one example of the first curve waveguide 2A11 and the second curve waveguide 2A12 included in the bent waveguide 2. Each of the first curve waveguide 2A11 and the second curve waveguide 2A12 is a curve waveguide that has a rib type and that is arranged to be parallel to the clothoid curve. The polygon of each of the clothoid curves (A, R) is a set of points that are enclosed by Pinner and Pouter illustrated in FIG. 3C. The Pinner and the Pouter are defined by Mathematical Expression 1.

$$P_{inner} = P_{center} + \left[-\frac{W}{2}\sin(\theta),\ \frac{W}{2}\cos(\theta)\right] \qquad (1)$$

$$P_{outer} = P_{center} + \left[\frac{W}{2}\sin(\theta),\ -\frac{W}{2}\cos(\theta)\right]$$

Pcenter=(X, Y) is as represented by Mathematical Expression 2.

$$X = \frac{A}{\sqrt{2}}\int_0^{\theta}\frac{\cos(t)}{\sqrt{t}}dt \qquad (2)$$

$$Y = \frac{A}{\sqrt{2}}\int_0^{\theta}\frac{\sin(t)}{\sqrt{t}}dt$$

Then, an angle $\theta_0$ that is used for the clothoid curve is calculated by using Mathematical Expression 3.

$$0 \le \theta \le \theta_0 \qquad (3)$$

$$\theta_0 = \frac{A^2}{2R^2}$$

On the basis of Mathematical Expression 1, Mathematical Expression 2, and Mathematical Expression 3, a clothoid curve that is in accordance with the third curve waveguide 2A13 having the circular arc is calculated, and the rib 2A included in the bent waveguide 2 having the rib type is arranged on the box layer 5A along the easement curve including the circular arc and the clothoid curve.

Therefore, the rib 2A disposed along the easement curve has the curvature that is continuously changed; therefore, a mode mismatch is small in the output portion 20B, it is possible to decrease a loss in the basic mode, and thus the efficiency of removing the higher-order mode becomes high.

The excess slab 11 is formed on the outer side slab 3B that is arranged at the outer circumferential portion of the rib 2A included in the bent waveguide 2. Furthermore, the excess slab 11 is formed such that the angle of incidence formed by an incident traveling direction X1 in which the unneeded mode leaking from the rib 2A is incident on the slab end of the excess slab 11 and a normal line X2 of the slab end is less than a critical angle that is a threshold in which total reflection occurs.

Figure 4A:
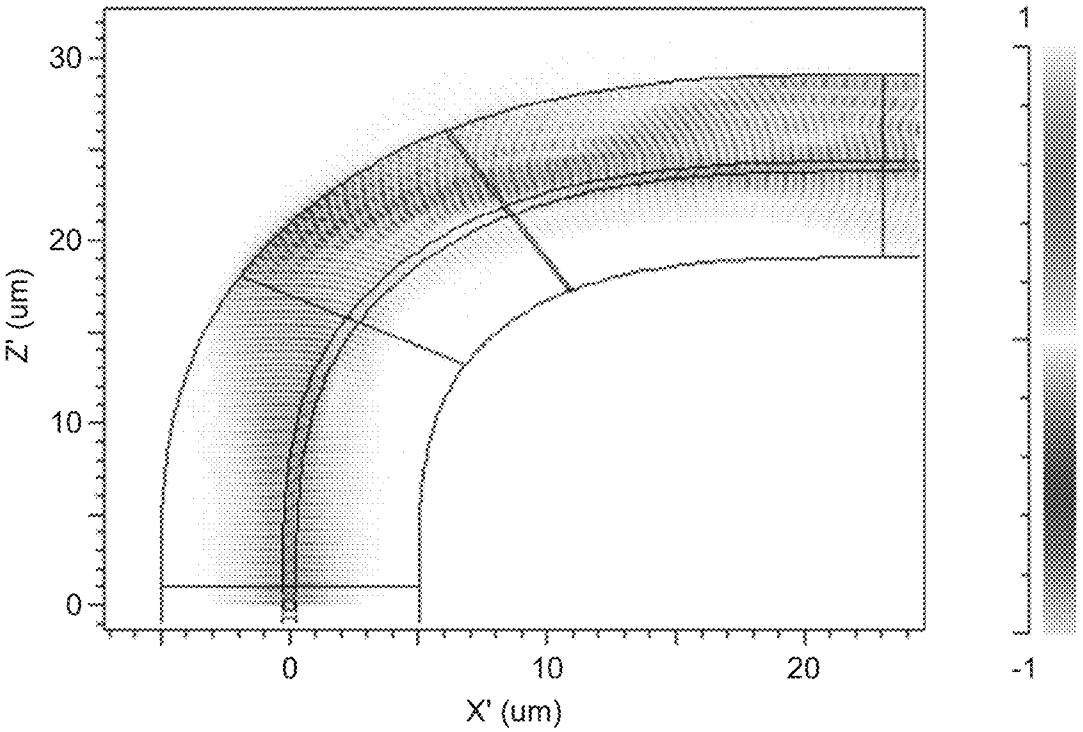
FIG. 4A is a diagram illustrating one example of an electric field distribution at the time of an input of a TE1 mode to the substrate type optical waveguide element obtained in the case where an excess slab is not present.

FIG. 4A is a diagram of one example of an electric field distribution at the time of an input of the TE1 mode to the substrate type optical waveguide element obtained in the case where the excess slab 11 is not present. The slab width of each of the inner part slab and the outer side slab of the rib type bent waveguide is usually fixed by a constant width in order to maintain continuity of a cross-sectional structure. In the bent waveguide 2 without the excess slab 11, the unneeded mode (TE1) confined in the rib is temporarily converted to the slab mode, but is reflected at the slab end. Furthermore, the reflected slab mode travels in the waveguide traveling direction, is converted to the unneeded mode (TE1), and again propagates through the bent waveguide 2 having the rib type. Consequently, with only the bent waveguide that is not provided with the excess slab 11, an amount of the unneeded mode (TE1) that is able to be removed is small.

Figure 4B:
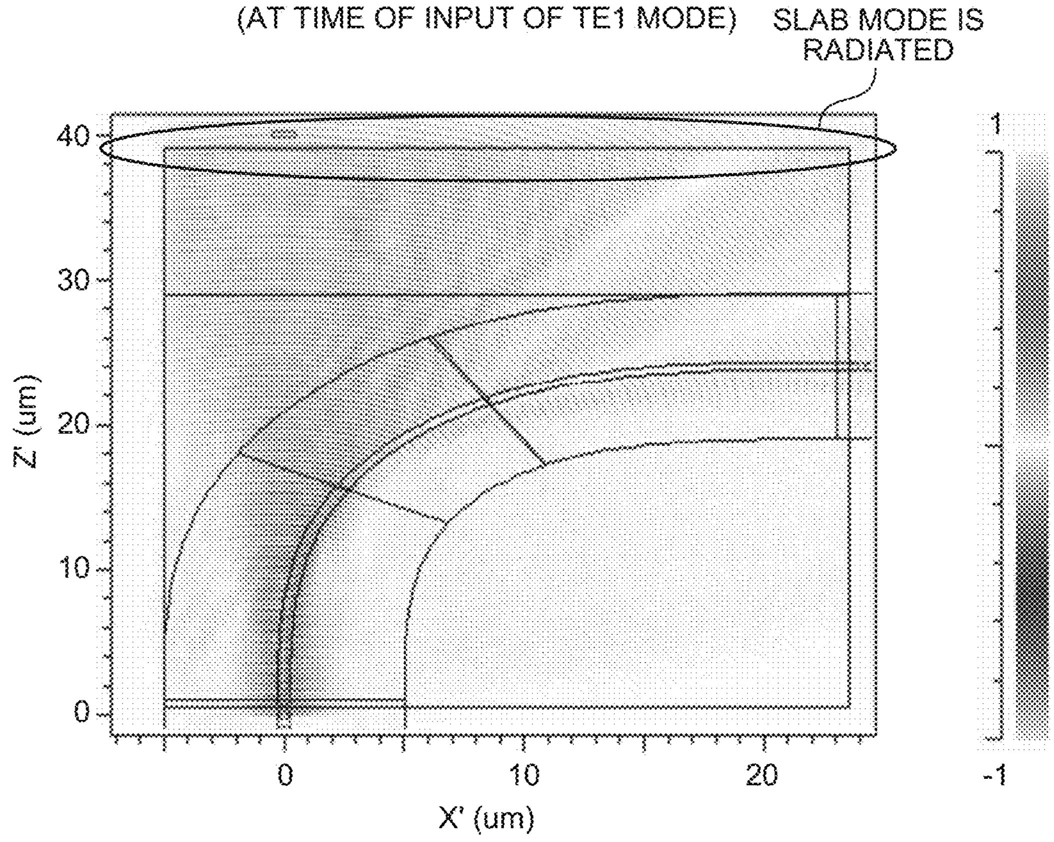
FIG. 4B is a diagram illustrating one example of an electric field distribution at the time of an input of a TE1 mode to the substrate type optical waveguide element obtained in the case where the excess slab is present.

Accordingly, by arranging the excess slab 11 at the outer circumferential portion of the bent waveguide 2, signal light that has been temporarily converted to the slab mode in the bent waveguide 2 is prevented from being reflected in the waveguide traveling direction and is removed (radiated) at the slab end. FIG. 4B is a diagram of one example of an electric field distribution at the time of an input of the TE1 mode to the substrate type optical waveguide element 1 obtained in the case where the excess slab 11 is present. In the bent waveguide 2 with the excess slab 11, the unneeded mode confined in the rib 2A is temporarily converted to the slab mode, but the slab end is located at the excess slab 11, and thus, the slab mode is radiated at the slab end. It is possible to remove the slab mode from the bent waveguide 2 as a result of the slab mode being radiated. Consequently, it is possible to suppress travelling of the slab mode in the bent waveguide 2 in the waveguide traveling direction, and it is possible to prevent the slab mode from being converted to the unneeded mode (TE1) and again propagating through the bent waveguide 2 having the rib type.

In addition, the slab 3 disposed parallel to the rib 2A does not have a bent shape, so that the slab mode propagating above the slab 3 travels straight forward the excess slab 11 without propagating through the bent waveguide 2 in the waveguide traveling direction, so that it is possible to remove the unneeded mode.

The unneeded mode travelling through the rib 2A is radiated by the slab end located at the excess slab 11. As a result of the unneeded mode travelling through the rib 2A being radiated, it is possible to prevent the unneeded mode from propagating through the bent waveguide 2 having the rib type. In addition, the unneeded mode is radiated to the outside of the waveguide at the slab end.

In addition, the slab width of the inner part slab 3A that is arranged at the inner circumferential portion of the bent waveguide 2 is also wider than the slab width of the inner part slab.

FIG. 5 is a diagram illustrating a comparative example between the substrate type optical waveguide element 1 according to the first embodiment and the substrate type optical waveguide element that is conventionally used. The conventionally used substrate type optical waveguide element is constituted such that the wavelength of signal light to be guided is 1.55 um, a manufacturing error is not generated, the slab thickness is 150 nm, and the core thickness is 220 nm, and, in the case where TE1 is cut by 37 dB from the rib, 248 um is needed for the waveguide length.

In contrast, the substrate type optical waveguide element 1 according to the first embodiment is constituted such that the wavelength of signal light to be guided is 1.55 um, a manufacturing error is not generated, the slab thickness is 90 nm, and the core thickness is 220 nm, and, in the case where TE1 is cut by 37 dB from the rib 2A, only 39 um is needed for the waveguide length. In other words, in the case where TE1 is cut by 37 dB from the rib 2A, only 39 um is needed for the waveguide length, so that it is possible to contribute to a reduction in size of the substrate type optical waveguide element 1 by shortening the waveguide length as compared to the conventional technology.

In the substrate type optical waveguide element 1 according to the first embodiment, the unneeded mode is converted to the slab mode in the bent waveguide 2, the slab mode is radiated in a horizontal direction by using the excess slab 11, and the unneeded mode is removed from the bent waveguide 2. Consequently, it is possible to improve a reduction in size of the waveguide length as compared to the conventional technology.

The substrate type optical waveguide element 1 is a rib type waveguide in which the bent waveguide 2 that is parallel to the easement curve that has the curvature that varies continuously, so that it is possible to convert the unneeded mode propagating through the bent waveguide 2 to the slab mode. A loss in the basic mode is small in the bent waveguide 2, a mode mismatch occurring in the output portion 20B is reduced, so that it is possible to reduce a loss in the basic mode. In addition, as a result of a reduction in the mode mismatch occurring in the output portion 20B, conversion of the basic mode to the unneeded mode is suppressed, and the efficiency of the removal of the unneeded mode is increased.

Figure 6:
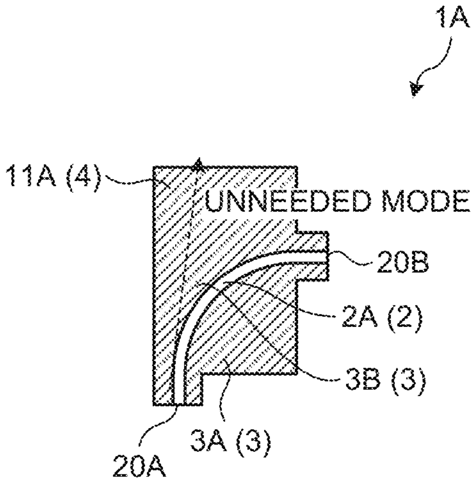
FIG. 6 is a schematic plan view illustrating one example of a configuration of a substrate type optical waveguide element according to another form of the first embodiment.

In addition, the shape of the excess slab 11 included in the substrate type optical waveguide element 1 illustrated in FIG. 1 is not limited, and appropriate modifications are possible. FIG. 6 is a schematic plan view illustrating one example of a configuration of a substrate type optical waveguide element 1A according to another form of the first embodiment. An excess slab 11A included in the substrate type optical waveguide element 1A illustrated in FIG. 6 is constituted to have a structure such that the length of the excess slab 11A is longer than the excess slab 11 that is included in the substrate type optical waveguide element 1 illustrated in FIG. 1. The excess slab 11A is formed on the outer side slab 3B that is arranged at the outer circumferential portion of the rib 2A included in the bent waveguide 2. Then, the excess slab 11A is formed such that an angle of incidence formed by an incident traveling direction in which the unneeded mode leaking from the rib 2A is incident on the slab end of the excess slab 11A and the normal line of the slab end is equal to or less than a critical angle that is a threshold in which total reflection occurs.

In the substrate type optical waveguide element 1A, it is possible to reduce the waveguide length as compared to the waveguide length used in the conventional technology. Furthermore, in the substrate type optical waveguide element 1A, the slab mode including the unneeded mode is radiated in the horizontal direction in the excess slab 11A, so that it is possible to remove the unneeded mode from the bent waveguide 2.

Figure 7:
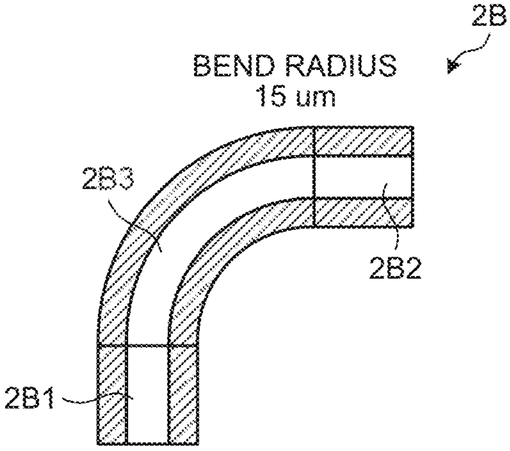
FIG. 7 is a diagram illustrating one example of a bent waveguide parallel to a circular arc.

In addition, with the bent waveguide 2 according to the first embodiment, the bent waveguide 2 that has a rib type and that is parallel to the easement curve has been described as an example; however, a bent waveguide 2B that is parallel to a circular arc may be used, and appropriate modifications are possible. However, there is a little problem in the case where the bent waveguide is parallel to the circular arc. FIG. 7 is a diagram illustrating one example of the bent waveguide 2B that is parallel to the circular arc. In the rib 2A that is included in the bent waveguide 2B and that is parallel to the circular arc, a mode mismatch occurring at the output portion 20B is larger as compared to a case of the easement curve, a loss is generated in the basic mode.

Regarding, confinement of light to the rib 2A is weaker in the higher-order mode than that in the basic mode (TE0, etc.), so that, if light passes through a sharp bent waveguide, a propagation loss is larger as compared to the basic mode (TE0). However, in the bent waveguide 2B that is parallel to the circular arc, an electric field mismatch occurs as a result of a difference in the curvature between a bent waveguide 2B3 that is parallel to the circular arc and straight line waveguides 2B1 and 2B2. For example, in the case where the bend radius of the circular arc is 15 um and the wavelength of signal light is 1550 nm, a conversion rate from TE0 to TE1 becomes −25.3 dB at the discontinuous portion of the curvature (electric field mismatch). Consequently, basic mode TE0 is converted to the unneeded mode TE1 as the mode conversion caused by the electric field mismatch, so that a propagation loss occurs in the basic mode, and the efficiently of a removal of the higher-order mode is decreased.

Accordingly, in the first embodiment, instead of the circular arc, the bent waveguide 2 that has the rib type and that is parallel to the easement curve is provided, so that the curvature varies continuously, and, by eliminating the discontinuous portion of the curvature, it is possible to improve the propagation loss in the basic mode and the efficiency of the removal of the higher-order mode. However, even when the excess slab 11 is arranged at the outer circumferential portion of the bent waveguide 2B that is parallel to the circular arc, it is possible to, of course, remove the unneeded mode from the bent waveguide 2B.

In addition, a case has been described as an example in which the substrate type optical waveguide element 1 according to the first embodiment is constituted such that the waveguide width of the slab end of the excess slab 11 has the constant width. However, it may be possible to constitute a tapered waveguide in which the waveguide width of the slab end of the excess slab 11 is gradually decreased with respect to the radial direction of the unneeded mode, and an embodiment thereof will be described below as a the second embodiment. In addition, by assigning the same reference numerals to components having the same configuration as those in the substrate type optical waveguide element 1 according to the first embodiment, overlapped descriptions of the configuration and the operation thereof will be omitted.

(b) Second Embodiment

Figure 8:
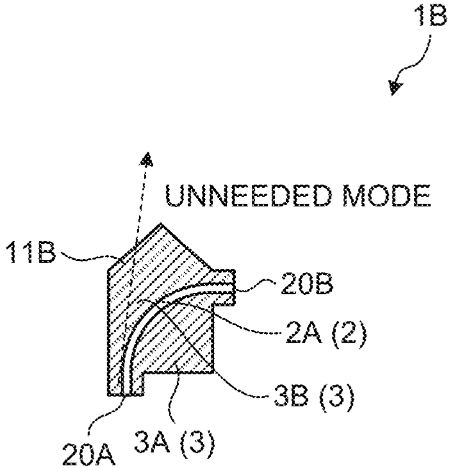
FIG. 8 is a schematic plan view illustrating one example of a configuration of a substrate type optical waveguide element according to a second embodiment.

FIG. 8 is a schematic plan view illustrating one example of a configuration of a substrate type optical waveguide element 1B according to the second embodiment. An excess slab 11B included in the substrate type optical waveguide element 1B illustrated in FIG. 8 is different from the excess slab 11 included in the substrate type optical waveguide element 1 according to the first embodiment in that a tapered waveguide is constituted such that the waveguide width of the slab end of the excess slab 11B is gradually decreased with respect to the radial direction of the unneeded mode.

The excess slab 11B provided at the tapered waveguide is constituted such that the waveguide width is gradually decreased toward the slab end, so that an amount of reflection of the slab mode at the slab end is decreased. Accordingly, it is possible to prevent, while suppressing the reflected light in the slab mode, the slab mode again propagating through the bent waveguide 2 having the rib type as a result of the slab mode being converted to the unneeded mode (TE1).

Figure 9:
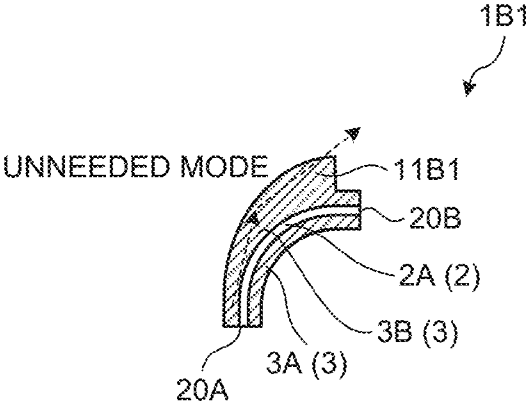
FIG. 9 is a schematic plan view illustrating one example of a configuration of a substrate type optical waveguide element according to another form of the second embodiment.

In addition, the shape of the excess slab 11B included in the substrate type optical waveguide element 1B according to the second embodiment is not limited to the shape illustrated in FIG. 8, and appropriate modifications are possible. FIG. 9 is a schematic plan view illustrating one example of a configuration of a substrate type optical waveguide element 1B1 according to another form of the second embodiment. In addition, by assigning the same reference numerals to components having the same configuration as those in the substrate type optical waveguide element 1B illustrated in FIG. 8, overlapped descriptions of the configuration and the operation thereof will be omitted. The substrate type optical waveguide element 1B1 illustrated in FIG. 9 includes an excess slab 11B1 that is arranged on the outer side slab 3B located at the outer circumferential portion of the rib 2A. The excess slab 11B1 is a tapered waveguide in which the waveguide width of the slab end is gradually decreased with respect to the radial direction of the slab mode.

The excess slab 11B that is the tapered waveguide has a structure in which the waveguide width is gradually decreased toward the slab end, so that an amount of reflection of the slab mode at the slab end is decreased. Therefore, it is possible to prevent, while suppressing the reflected light in the slab mode, the slab mode again propagating through the bent waveguide 2 having the rib type as a result of the slab mode being converted to the unneeded mode (TE1).

In addition, a case has been described as an example in which the excess slab 11 included in the substrate type optical waveguide element 1 according to the first embodiment radiates the unneeded mode from the slab end to the outside of the waveguide; however, there may be conceivably a case in which the unneeded mode that has been radiated to the outside of the waveguide affects another element other than the waveguide. Accordingly, in order to cope with the circumstances, an embodiment thereof will be described below as a third embodiment.

(c) Third Embodiment

Figure 10:
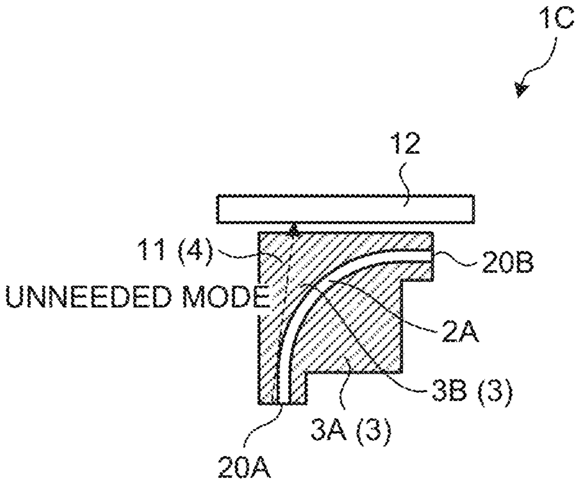
FIG. 10 is a schematic plan view illustrating one example of a configuration of a substrate type optical waveguide element according to a third embodiment.

FIG. 10 is a schematic plan view illustrating one example of a configuration of a substrate type optical waveguide element 1C according to the third embodiment. In addition, by assigning the same reference numerals to components having the same configuration as those in the substrate type optical waveguide element 1 according to the first embodiment, overlapped descriptions of the configuration and the operation thereof will be omitted. The substrate type optical waveguide element 1C illustrated in FIG. 10 is different from the substrate type optical waveguide element 1 illustrated in FIG. 1 in that an absorber 12 is arranged in the vicinity of the slab end of the excess slab 11. The absorber 12 absorbs the unneeded mode that is radiated from the slab end of the excess slab 11 to the outside of the waveguide. The absorber 12 is constituted of, for example, a Si structure, an N doped member, a P doped member, germanium, metal, and the like.

The unneeded mode travelling through the interior of the rib 2A is radiated by the slab end that is located at the excess slab 11. The unneeded mode travelling through the interior of the rib 2A is radiated, so that it is possible to prevent the unneeded mode from propagating through the bent waveguide 2 that has the rib type. The absorber 12 has been arranged in the vicinity of the slab end of the excess slab 11, so that the unneeded mode radiated from the slab end is absorbed.

In the substrate type optical waveguide element 1C according to the third embodiment, the absorber 12 for light has been arranged in the vicinity of the slab end of the excess slab 11, so that it is possible to suppress the effect on another element caused by the unneeded mode that has been radiated by the excess slab 11.

Figure 11A:
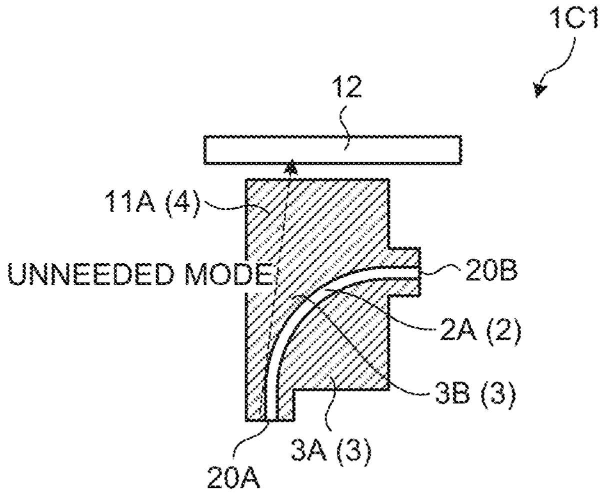
FIG. 11A is a schematic plan view illustrating one example of a configuration of a substrate type optical waveguide element according to another form of the third embodiment.

In addition, a case has been described as an example in which, in the substrate type optical waveguide element 1C illustrated in FIG. 10, the absorber 12 is arranged in the vicinity of the slab end of the excess slab 11; however, the shape of the excess slab 11 is not limited, and appropriate modifications are possible. FIG. 11A is a schematic plan view illustrating one example of a configuration of a substrate type optical waveguide element 1C1 according to another form of the third embodiment. The substrate type optical waveguide element 1C1 illustrated in FIG. 11A includes the absorber 12 that is arranged in the vicinity of the slab end of the excess slab 11A.

In the substrate type optical waveguide element 1C1, the absorber 12 for light has been arranged in the vicinity of the slab end of the excess slab 11A, so that it is possible to suppress the effect on another element caused by the unneeded mode that has been radiated by the excess slab 11A.

Figure 11B:
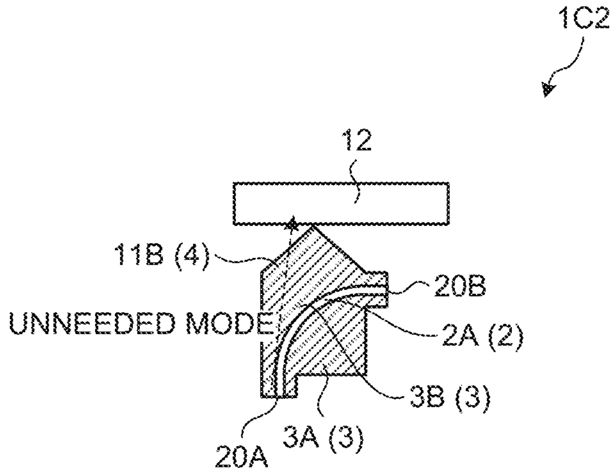
FIG. 11B is a schematic plan view illustrating one example of a configuration of a substrate type optical waveguide element according to another form of the third embodiment.

FIG. 11B is a schematic plan view illustrating one example of a configuration of a substrate type optical waveguide element 1C2 according to another form of the third embodiment. The substrate type optical waveguide element 1C2 illustrated in FIG. 11B includes the absorber 12 that is disposed in the vicinity of the slab end of the excess slab 11B provided in the tapered waveguide.

In the substrate type optical waveguide element 1C2, the absorber 12 for light has been arranged in the vicinity of the slab end of the excess slab 11B, so that it is possible to suppress the effect on another element caused by the unneeded mode that has been radiated by the excess slab 11B.

In addition, a case has been described as an example in which, in the substrate type optical waveguide element 1B according to the second embodiment, the slab end includes the excess slab 11B provided in the tapered waveguide; however, the example is not limited to this, and appropriate modifications are possible. Accordingly, an embodiment thereof will be described below as fourth embodiment.

(d) Fourth Embodiment

Figure 12:
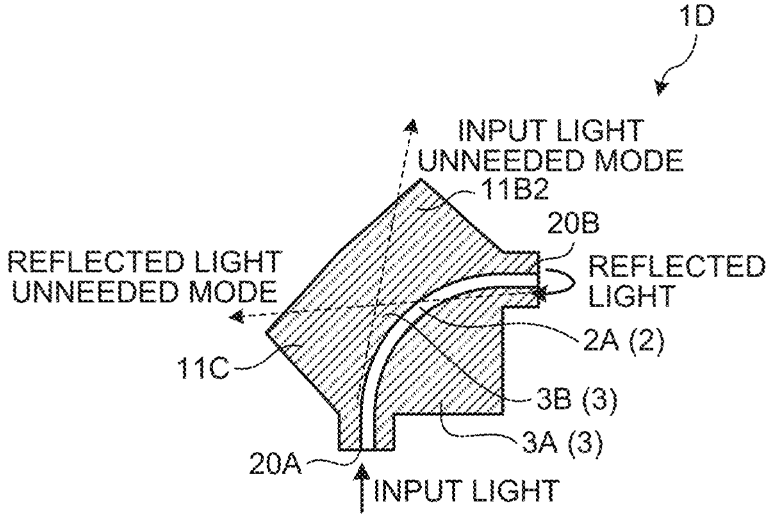
FIG. 12 is a schematic plan view illustrating one example of a configuration of a substrate type optical waveguide element according to a fourth embodiment.

FIG. 12 is a schematic plan view illustrating one example of a configuration of a substrate type optical waveguide element 1D according to the fourth embodiment. The excess slab 11B included in the substrate type optical waveguide element 1D illustrated in FIG. 12 includes a first radiation portion 11B2 that radiates an input light unneeded mode, and a second radiation portion 11C that radiates a reflected light unneeded mode. The input light unneeded mode is a first slab mode that is an unneeded mode other than the basic mode that inputs into the bent waveguide 2. The reflected light unneeded mode is a second slab mode that is the reflected light of the basic mode that outputs from the bent waveguide 2. The first radiation portion 11B2 removes the unneeded mode propagating through the interior of the rib 2A included in the bent waveguide 2 by radiating the unneeded mode included in the slab mode converted by the bent waveguide 2. The second radiation portion 11C is also able to remove the unneeded mode of the reflected light from among the reflected light received from the output portion 20B of the bent waveguide 2 by radiating the unneeded mode.

In the excess slab 11 included in the substrate type optical waveguide element 1D according to the fourth embodiment, both of the first radiation portion 11B2 and the second radiation portion 11C has been arranged, the input light unneeded mode and the reflected light unneeded mode are radiated to the outside of the waveguide at the slab end. Consequently, it is possible to suppress the effect of the unneeded mode and the reflected light with respect to the main signal in the interior of the bent waveguide 2.

In addition, a case has been described as an example in which the inner part slab 3A has been arranged at the inner circumferential portion of the rib 2A included in the substrate type optical waveguide element 1 illustrated in FIG. 1; however, the example is not limited to this, and another shape may be used for the inner part slab 3A, and appropriate modifications are possible. Accordingly, an embodiment will be described below as a fifth embodiment.

(e) Fifth Embodiment

Figure 13:
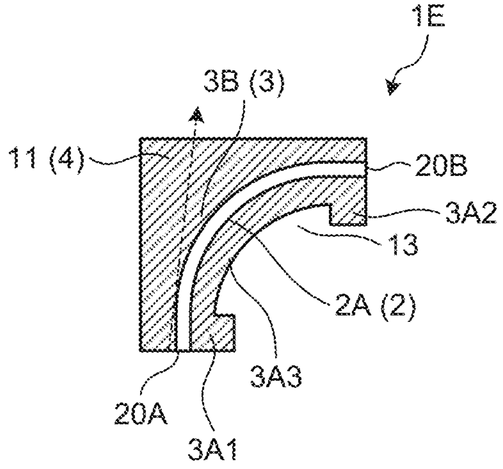
FIG. 13 is a schematic plan view illustrating one example of a configuration of a substrate type optical waveguide element according to a fifth embodiment.

FIG. 13 is a schematic plan view illustrating one example of a configuration of a substrate type optical waveguide element 1E according to the fifth embodiment. In addition, by assigning the same reference numerals to components having the same configuration as those in the substrate type optical waveguide element 1 according to the first embodiment, overlapped descriptions of the configuration and the operation thereof will be omitted. The inner part slab 3A disposed at the rib 2A included in the substrate type optical waveguide element 1E illustrated in FIG. 13 includes a first inner part slab 3A1 disposed in the vicinity of the input portion 20A of the rib 2A, a second inner part slab 3A2 disposed in the vicinity of the output portion 20B of the rib 2A, and a notch slab 3A3. The notch slab 3A3 is formed such that the inner part slab 3A that is disposed between the first inner part slab 3A1 and the second inner part slab 3A2 is notched so as to form an opening portion 13.

The inner part slab 3A includes a discontinuous point disposed between the first inner part slab 3A1 and the notch slab 3A3, and a discontinuous point disposed between the notch slab 3A3 and the second inner part slab 3A2. By forming the two discontinuous points in the inner part slab 3A, a loss in the unneeded mode that has an electric field in the inner circumferential side slab is allowed to be increased.

In the substrate type optical waveguide element 1E according to the fifth embodiment, if a higher-order unneeded mode is input to the rib 2A, the slab mode that has been converted in the bent waveguide 2 is allowed to be optically transitioned to the outer side slab 3B that is arranged at the outer circumferential portion of the bent waveguide 2, and the unneeded mode is radiated from the slab end that is located at the excess slab 11. Furthermore, a loss in the unneeded mode is increased at the discontinuous point disposed in the interior of the inner part slab 3A that is arranged at the inner circumferential portion of the bent waveguide 2. Consequently, it is also possible to remove the unneeded mode in the interior of the bent waveguide 2 from the inner part slab 3A.

Figure 14A:
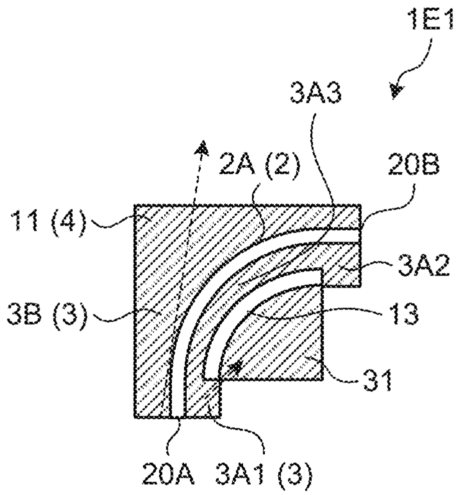
FIG. 14A is a schematic plan view illustrating one example of a configuration of a substrate type optical waveguide element according to another form of the fifth embodiment.

In addition, a case has been described as an example in which the inner part slab 3A included in the substrate type optical waveguide element 1E according to the fifth embodiment forms the notch slab 3A3; however, the example is not limited to this. FIG. 14A is a schematic plan view illustrating one example of a configuration of a substrate type optical waveguide element 1E1 according to another form of the fifth embodiment. In addition, by assigning the same reference numerals to components having the same configuration as those in the substrate type optical waveguide element 1E illustrated in FIG. 13, overlapped descriptions of the configuration and the operation thereof will be omitted. A Si structure 31 is arranged at the notch slab 3A3 that is included in the inner part slab 3A in the substrate type optical waveguide element 1E1 illustrated in FIG. 14A. The Si structure 31 radiates the unneeded mode leaking to the inner part slab 3A that is arranged at the inner circumferential portion of the rib 2A included in the bent waveguide 2. Consequently, it is also possible to remove the unneeded mode that is present in the bent waveguide 2 from the inner part slab 3A.

Figure 14B:
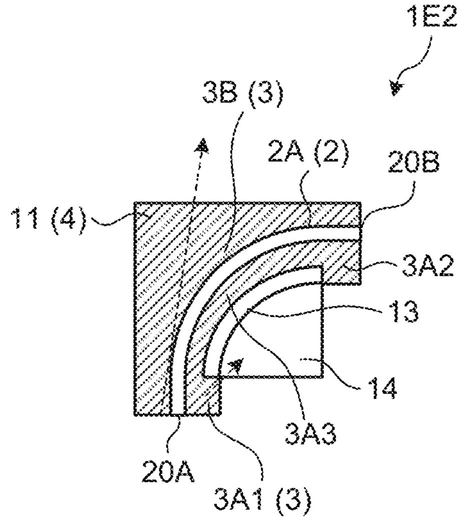
FIG. 14B is a schematic plan view illustrating one example of a configuration of a substrate type optical waveguide element according to another form of the fifth embodiment.

FIG. 14B is a schematic plan view illustrating one example of a configuration of a substrate type optical waveguide element 1E2 according to another form of the fifth embodiment. In addition, by assigning the same reference numerals to components having the same configuration as those in the substrate type optical waveguide element 1E illustrated in FIG. 13, overlapped descriptions of the configuration and the operation thereof will be omitted. An absorber 14 is arranged at the notch slab 3A3 that is disposed at the inner part slab 3A included in the substrate type optical waveguide element 1E2 illustrated in FIG. 14B. The absorber 14 is constituted of, for example, an N doped member, a P doped member, a member that is made of germanium, metal, and the like. The absorber 14 absorbs the unneeded mode that is radiated from the inner part slab 3A arranged at the inner circumferential portion of the rib 2A included in the bent waveguide 2. Consequently, it is also possible to remove the unneeded mode that is present in the bent waveguide 2 from the inner part slab 3A. In addition, it is possible to suppress the effect of the radiated unneeded mode with respect to the element disposed at the outside of the waveguide.

In addition, a case has been described as an example in which the absorber 12 is arranged at the slab end of the excess slab 11A that is arranged at the outer circumferential portion of the rib 2A of the bent waveguide 2 included in the substrate type optical waveguide element 1C1 illustrated in FIG. 11A; however, the example is not limited to this, and an embodiment thereof will be described below as a sixth embodiment.

(f) Sixth Embodiment

Figure 15:
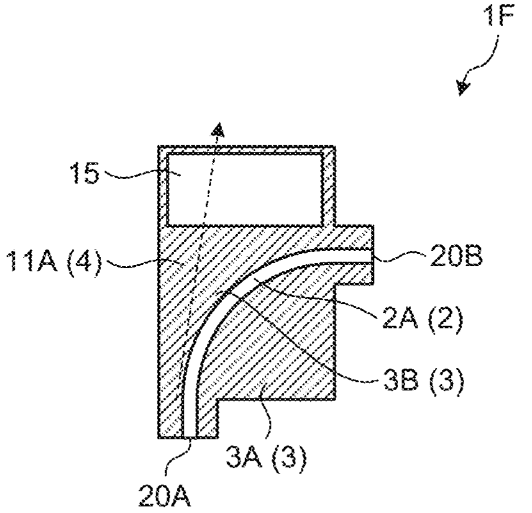
FIG. 15 is a schematic plan view illustrating one example of a configuration of a substrate type optical waveguide element according to a sixth embodiment.

FIG. 15 is a schematic plan view illustrating one example of a configuration of a substrate type optical waveguide element 1F according to the sixth embodiment. In addition, by assigning the same reference numerals to components having the same configuration as those in the substrate type optical waveguide element 1 according to the first embodiment, overlapped descriptions of the configuration and the operation thereof will be omitted. The characteristic of the substrate type optical waveguide element 1F illustrated in FIG. 15 is that an absorbing portion 15 is arranged in the interior of the excess slab 11A that is arranged at the outer circumferential portion of the rib 2A provided in the bent waveguide 2. The absorbing portion 15 is constituted in, for example, an N doped area, a P doped area, an area in which germanium is arranged, an area in which metal is arranged, or the like included in the area of the excess slab 11A.

The unneeded mode travelling through the interior of the rib 2A is radiated by the slab end that is located at the excess slab 11A. As a result of the unneeded mode travelling through the interior of the rib 2A being radiated, it is possible to prevent the unneeded mode from propagating through the bent waveguide 2 having the rib type. The absorbing portion 15 has been arranged in the interior of the excess slab 11A, so that it is possible to suppress the effect of the unneeded mode with respect to another element by absorbing the unneeded mode before the unneeded mode arrives at the slab end and is radiated by the slab end. Consequently, when the excess slab 11A radiates the unneeded mode in the horizontal direction, if another waveguide or another element is present in the radial direction, it is possible to suppress the effect of the unneeded mode with respect to the other waveguide or the other element.

Figure 16A:
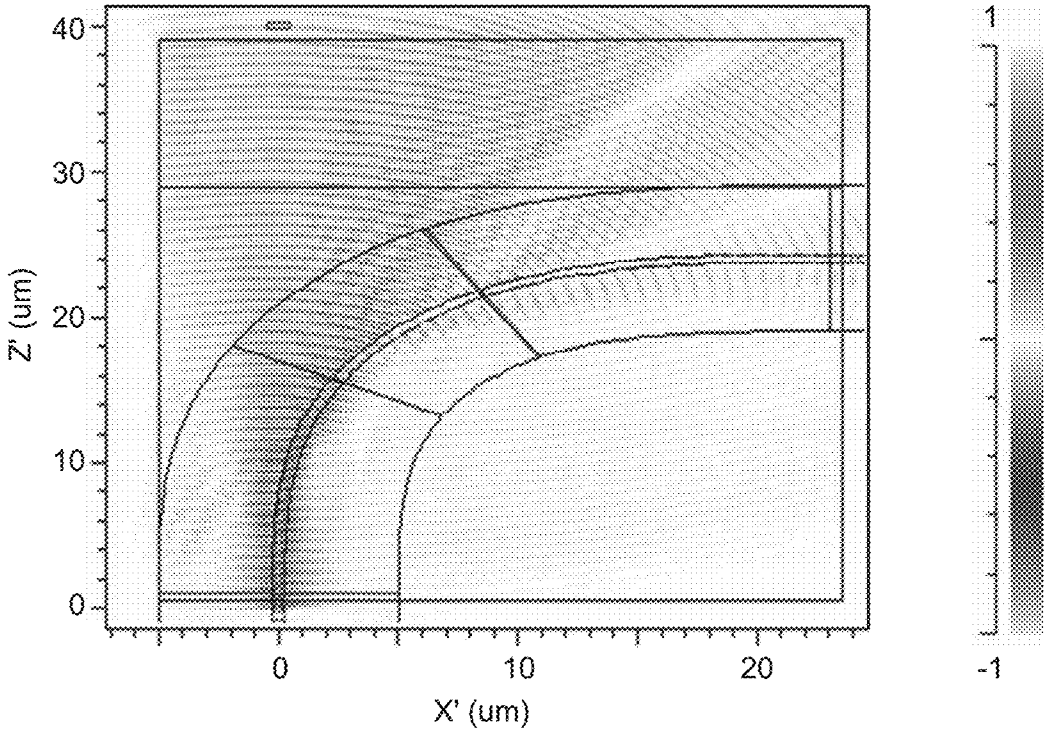
FIG. 16A is a diagram illustrating one example of an electric field distribution at the time of an input of the TE1 mode in the substrate type optical waveguide element obtained in the case where an absorbing portion is not present.

FIG. 16A is a diagram of one example of an electric field distribution at the time of an input of the TE1 mode in the substrate type optical waveguide element obtained in the case where the absorbing portion 15 is not present. In the bent waveguide with the excess slab 11A, the unneeded mode confined in the rib is temporarily converted to the slab mode, and the slab end is located at the excess slab 11A, so that the unneeded mode is radiated at the slab end of the excess slab 11A. Consequently, the unneeded mode is radiated at the slab end of the excess slab 11A, so that it is possible to prevent the unneeded mode propagating through the bent waveguide 2 having the rib type by suppressing the unneeded mode from travelling in the waveguide traveling direction of the bent waveguide.

Figure 16B:
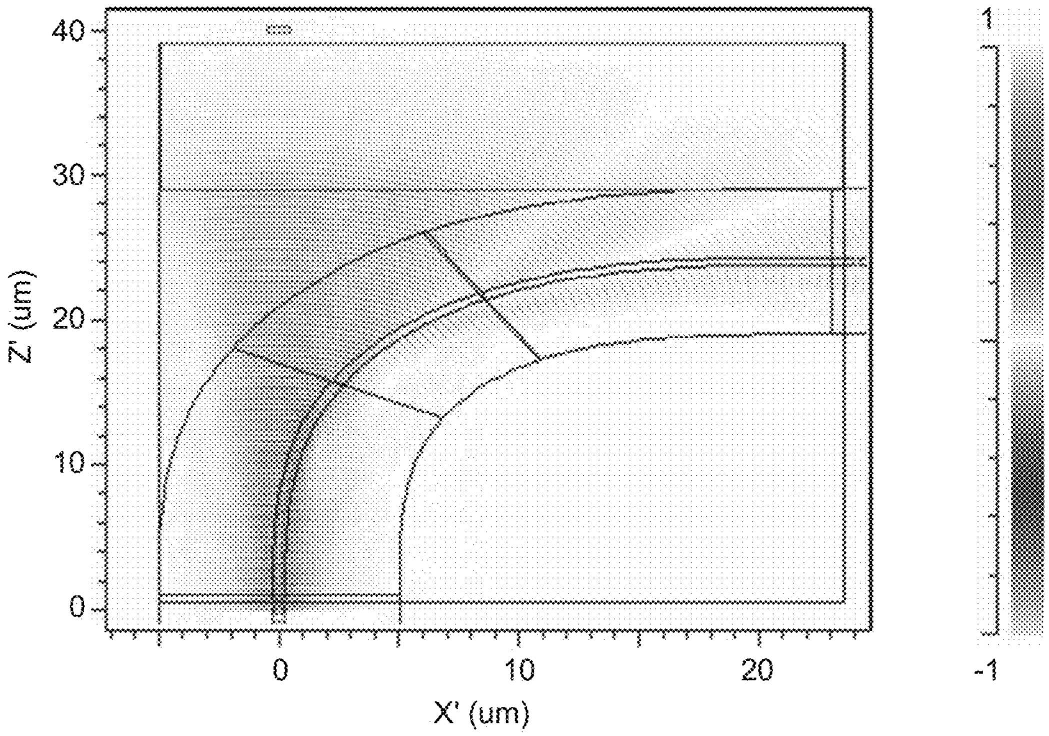
FIG. 16B is a diagram illustrating one example of an electric field distribution at the time of an input of the TE1 mode in the substrate type optical waveguide element obtained in the case where the absorbing portion is present.

In contrast, FIG. 16B is a diagram of one example of an electric field distribution at the time of an input of the TE1 mode that is present in the substrate type optical waveguide element 1F obtained in the case where the absorbing portion 15 is present. In the bent waveguide 2 with the excess slab 11A, the unneeded mode confined in the rib 2A is temporarily converted to the slab mode, and the slab end is located at the excess slab 11A, the unneeded mode is radiated at the slab end of the excess slab 11A. In addition, the absorbing portion 15 arranged in the interior of the excess slab 11A absorbs the unneeded mode that propagates through the excess slab 11A. Consequently, as compared to the substrate type optical waveguide element without the absorbing portion 15, it is possible to prevent the unneeded mode from propagating through the bent waveguide 2 having the rib type by suppressing the unneeded mode from travelling in the waveguide traveling direction of the bent waveguide 2.

In the substrate type optical waveguide element 1F according to the sixth embodiment, the absorbing portion 15 has been arranged in the interior of the excess slab 11A, so that it is possible to avoid the effect of the unneeded mode with respect to another waveguide and another element that are disposed at the outside of the waveguide caused by the radiated light.

In addition, a case has been described as an example in which, in the substrate type optical waveguide element 1F illustrated in FIG. 15, the absorbing portion 15 is arranged in the interior of the excess slab 11A; however, the shape of the inner part slab 3A is not limited to this, and appropriate modifications are possible. FIG. 17 is a schematic plan view illustrating one example of a configuration of a substrate type optical waveguide element 1F1 according to another form of the sixth embodiment. The substrate type optical waveguide element 1F1 illustrated in FIG. 17 is constituted such that the slab width of an inner part slab 3A5 that is arranged at the inner circumferential portion of the bent waveguide 2 is decreased.

In the substrate type optical waveguide element 1F1, it is possible to suppress, by using the absorbing portion 15 included in the interior of the excess slab 11A, a crosstalk to another element or the like that is disposed at the outside of the waveguide.

In addition, a case has been described as an example in which, in the substrate type optical waveguide element 1F according to the sixth embodiment, the absorbing portion 15 is arranged in the interior of the excess slab 11A; however, the example is not limited to this, and an absorber may be arranged in the vicinity of the outer circumferential portion of the bent waveguide 2, and an embodiment thereof will be described below as a seventh embodiment.

(g) Seventh Embodiment

FIG. 18 is a schematic plan view illustrating one example of a configuration of a substrate type optical waveguide element 1G according to the seventh embodiment. The substrate type optical waveguide element 1G illustrated in FIG. 18 is constituted such that a bent absorber 16 is arranged in the vicinity of the outer circumferential portion of the bent waveguide 2. The bent absorber 16 is constituted of a material that absorbs light including, for example, an N doped material, a P doped material, a material made of germanium, metal, or the like. In addition, there is a need to arrange the bent absorber 16 at a position in which an electric field of the main signal mode propagating through the bent waveguide 2 is not applied. Furthermore, the substrate type optical waveguide element 1G is constituted such that the slab width of the inner part slab 3A5 arranged at the inner circumferential portion of the bent waveguide 2 is decreased.

FIG. 19 is a diagram of one example of an electric field distribution at the time of an input of the TE1 mode in the substrate type optical waveguide element 1G obtained in the case where the bent absorber 16 is present. In the bent waveguide 2, the unneeded mode confined in the rib 2A is temporarily converted to the slab mode, the unneeded mode that has been converted to the slab mode is absorbed by the bent absorber 16 that is arranged at the outer circumferential portion of the bent waveguide 2. Consequently, it is possible to prevent the unneeded mode from propagating through the bent waveguide 2 having the rib type by suppressing the unneeded mode from travelling in the waveguide traveling direction of the bent waveguide 2.

In the substrate type optical waveguide element 1G according to the seventh embodiment, the bent absorber 16 has been arranged in the vicinity of the outer circumferential portion of the bent waveguide 2, so that it is possible to prevent the unneeded mode from propagating through the bent waveguide 2 having the rib type by absorbing the unneeded mode received from the bent waveguide 2. Furthermore, in the substrate type optical waveguide element 1G, the bent absorber 16 has been arranged in the vicinity of the outer circumferential portion of the bent waveguide 2, so that it is possible to, of course, suppress a crosstalk to another element or the like that is disposed at the outside of the waveguide, and it is also possible to contribute to a reduction in size of the substrate type optical waveguide element 1G.

In addition, a case has been described as an example in which, in the substrate type optical waveguide element 1G according to the seventh embodiment, the bent absorber 16 is arranged in the vicinity of the outer circumferential portion of the bent waveguide 2; however, the shape of the inner part slab 3A arranged at the inner circumferential portion of the bent waveguide 2 may be changed. FIG. 20A is a schematic plan view illustrating one example of a configuration of a substrate type optical waveguide element 1G1 according to another form of the seventh embodiment. In addition, by assigning the same reference numerals to components having the same configuration as those in the substrate type optical waveguide element 1G illustrated in FIG. 18, overlapped descriptions of the configuration and the operation thereof will be omitted. The inner part slab 3A disposed at the inner circumferential portion of the bent waveguide 2 that is included in the substrate type optical waveguide element 1G1 illustrated in FIG. 20A includes the first inner part slab 3A1 disposed in the vicinity of the input portion 20A of the bent waveguide 2, the second inner part slab 3A2 disposed in the vicinity of the output portion 20B of the bent waveguide 2, and the notch slab 3A3. The notch slab 3A3 is formed such that the inner part slab disposed between the first inner part slab 3A1 and the second inner part slab 3A2 is notched.

The inner part slab 3A includes a discontinuous point disposed between the first inner part slab 3A1 and the notch slab 3A3, and a discontinuous point disposed between the notch slab 3A3 and the second inner part slab 3A2. The discontinuous points are formed in the interior of the inner part slab 3A. Consequently, a loss in the unneeded mode having an electric field that is present in the inner circumferential side slab of the bent waveguide 2 is increased.

In the substrate type optical waveguide element 1G1, in the case where a higher-order unneeded mode is input to the bent waveguide 2, the unneeded mode is absorbed by the bent absorber 16 that is arranged at the outer circumferential portion of the bent waveguide 2. Furthermore, a loss in the unneeded mode is allowed to be increased at the discontinuous points disposed in the inner part slab 3A that is arranged at the inner circumferential portion of the bent waveguide 2. Consequently, it is also possible to remove the unneeded mode that is present in the bent waveguide 2 from the inner part slab 3A.

In addition, a case has been described as an example in which, in the substrate type optical waveguide element 1G according to the seventh embodiment, the bent absorber 16 is arranged in the vicinity of the outer circumferential portion of the bent waveguide 2; however, instead of the bent absorber 16, an absorbing portion 15A may be arranged at a part of the outer side slab 3B that is arranged at the outer circumferential portion of the bent waveguide 2. FIG. 20B is a schematic plan view illustrating one example of a configuration of a substrate type optical waveguide element 1G2 according to another form of the seventh embodiment. In addition, by assigning the same reference numerals to components having the same configuration as those in the substrate type optical waveguide element 1G illustrated in FIG. 18, overlapped descriptions of the configuration and the operation thereof will be omitted. The outer side slab 3B disposed at the outer circumferential portion of the bent waveguide 2 arranged in the substrate type optical waveguide element 1G2 illustrated in FIG. 20B is an extension slab 3B1 that is constituted such that the slab width of the extension slab 3B1 is wider than the common slab width. A part of the extension slab 3B1 is the absorbing portion 15A by being doped.

In the substrate type optical waveguide element 1G illustrated in FIG. 18, the bent absorber 16 has been arranged in the vicinity of the outer circumferential portion of the bent waveguide 2, so that the refractive index is changed in the bent absorber 16. Accordingly, a phenomenon in which light is confined between the bent absorber 16 and the bent waveguide 2 having the rib type, and thus, a loss in the higher-order mode is generated. In contrast, in the substrate type optical waveguide element 1G2 illustrated in FIG. 20B, a change in the refractive index caused by doping at the initial stage of the input does not occur, similarly to other embodiments, it is possible to convert the unneeded mode to the slab mode at the bent waveguide 2.

The bent waveguide 2 converts the unneeded mode to the slab mode, the converted slab mode travels straight forward and reaches the absorbing portion 15A, and is accordingly reflected to the slab end. Consequently, it is possible to remove the higher-order mode as a result of the reflected slab mode being absorbed by passing through the absorbing portion 15A.

In addition, FIG. 20C is a schematic plan view illustrating one example of a configuration of a substrate type optical waveguide element 1G3 according to another form of the seventh embodiment. By assigning the same reference numerals to components having the same configuration as those in the substrate type optical waveguide element 1G2 illustrated in FIG. 20B, overlapped descriptions of the configuration and the operation thereof will be omitted. The substrate type optical waveguide element 1G3 illustrated in FIG. 20C is constituted such that the absorber 12 is arranged on the outer side of the absorber 15A of the extension slab 3B1.

The unneeded mode travelling in the interior of the rib 2A is radiated by the slab end that is disposed at the extension slab 3B1. As a result of the unneeded mode travelling through the interior of the rib 2A being radiated, it is possible to prevent the unneeded mode from propagating through the bent waveguide 2 having the rib type. The absorber 12 has been arranged in the vicinity of the slab end of the extension slab 3B1, so that the unneeded mode that has been radiated from the slab end is absorbed.

As a result, in the substrate type optical waveguide element 1G3, the absorber 12 for light has been arranged in the vicinity of the slab end of the extension slab 3B1, it is possible to suppress the effect of the unneeded mode radiated at the extension slab 3B1 with respect to another element.

In addition, a case has been described as an example in which the excess slab 11 included in the substrate type optical waveguide element 1D illustrated in FIG. 12 includes the first radiation portion 11B2 that radiates the input light unneeded mode, and the second radiation portion 11C that radiates the reflected light unneeded mode. However, the example is not limited to this, and an embodiment thereof will be described below as an eighth embodiment.

(h) Eighth Embodiment

FIG. 21 is a schematic plan view illustrating one example of a configuration of a substrate type optical waveguide element 1H according to the eighth embodiment. In addition, the substrate type optical waveguide element 1D illustrated in FIG. 12 is different from the substrate type optical waveguide element 1H illustrated in FIG. 21 in that a first absorber 16A1 is arranged instead of the first radiation portion 11B2, and a second absorber 16A2 is arranged instead of the second radiation portion 11C.

The first absorber 16A1 is arranged at the slab end of the excess slab 11. The first absorber 16A1 absorbs the input light unneeded mode that is the slab mode converted by the bent waveguide 2. The second absorber 16A2 is disposed at the slab end of the excess slab 11. The second absorber 16A2 absorbs the reflected light unneeded mode that is reflected from another element disposed in the rear stage that is connected from the output stage of the bent waveguide 2.

In the substrate type optical waveguide element 1H according to the eighth embodiment, the input light unneeded mode is absorbed by using the first absorber 16A1, so that it is possible to suppress the effect of a crosstalk or the like to another element disposed at the outside of the waveguide located in the radial direction of the input light unneeded mode. Furthermore, in the substrate type optical waveguide element 1H, the reflected light unneeded mode that is reflected from another element disposed in the rear stage that is connected from the output stage of the bent waveguide 2 is absorbed by using the second absorber 16A2, it is possible to suppress the effect of a crosstalk or the like to another element disposed at the outside of the waveguide located in the radial direction of the reflected light unneeded mode.

(i) Ninth Embodiment

FIG. 22 is a schematic plan view illustrating one example of a configuration of a substrate type optical waveguide element 1J according to the ninth embodiment. The substrate type optical waveguide element 1J illustrated in FIG. 22 includes a first optical waveguide element 30A and a second optical waveguide element 30B. The first optical waveguide element 30A includes a first bent waveguide 2A1, a first inner part slab 3A11 that is arranged at the inner circumferential portion of the first bent waveguide 2A1, and a first outer side slab 3B11 that is arranged at the outer circumferential portion of the first bent waveguide 2A1. The first optical waveguide element 30A includes a first excess slab 11A11 that is arranged on the first outer side slab 3B11, and a first absorbing portion 15A11 that is arranged on the slab end side of the first excess slab 11A11. The first bent waveguide 2A1 is a bent waveguide that guides the signal light from an input portion 20A1 to an output portion 20B1 and that is curved to the right side of the traveling direction of light. The first excess slab 11A11 propagates the unneeded mode of the slab mode converted in the first bent waveguide 2A1 in the horizontal direction. Furthermore, the first absorbing portion 15A11 absorbs the unneeded mode propagating through the first excess slab 11A11. In addition, the first absorbing portion 15A11 is constituted of an area that is included in the area of the first excess slab 11A11 and in which light is absorbed, that is, for example, an N doped area, a P doped area, an area in which germanium, metal, or the like is arranged.

The second optical waveguide element 30B includes a second bent waveguide 2A2, a second inner part slab 3A12 that is arranged at the inner circumferential portion of the second bent waveguide 2A2, and a second outer side slab 3B12 that is arranged at the outer circumferential portion of the second bent waveguide 2A2. The second optical waveguide element 30B includes a second excess slab 11B11 that is arranged on the second outer side slab 3B12, and a second absorbing portion 15B11 that is arranged on the slab end side of the second excess slab 11B11. The second bent waveguide 2A2 is a bent waveguide that guides the signal light from an input portion 20A2 to an output portion 20B2 and that is curved to the left side of the traveling direction of light. The second excess slab 11B11 propagates the unneeded mode of the slab mode that is converted in the second bent waveguide 2A2 in the horizontal direction. Furthermore, the second absorbing portion 15B11 absorbs the unneeded mode propagating through the second excess slab 11B11. In addition, the second absorbing portion 15B11 is constituted of an area that is included in the area of the second excess slab 11B11 and in which light is absorbed, that is, for example, an N doped area, a P doped area, an area in which germanium, metal, or the like is arranged.

The substrate type optical waveguide element 1J forms an S-shaped bent waveguide by connecting the first bent waveguide 2A1 and the second bent waveguide 2A2. In other words, the first excess slab 11A11 and the first absorbing portion 15A11 radiate and absorb the unneeded mode located in the electric field that is present on the left side of the travelling direction of light in the first bent waveguide 2A1. Furthermore, the second excess slab 11B11 and the second absorbing portion 15B11 radiate and absorb the unneeded mode located in the electric field that is present on the right side of the travelling direction of light in the second bent waveguide 2A2.

The substrate type optical waveguide element 1J according to the ninth embodiment absorbs the unneeded mode located in the electric fields that is present on the both sides of the S-shaped bent waveguide. Consequently, it is possible to prevent the unneeded mode from propagating through the bent waveguide having the rib type by suppressing the unneeded mode from travelling through the S-shaped bent waveguide in the waveguide traveling direction.

In addition, a case has been described as an example in which the substrate type optical waveguide element 1J according to the ninth embodiment is constituted of the first optical waveguide element 30A and the second optical waveguide element 30B; however, the example is not limited to this, and appropriate modifications are possible. FIG. 23 is a schematic plan view illustrating one example of a configuration of a substrate type optical waveguide element 1J1 according to another form of the ninth embodiment. The substrate type optical waveguide element 1J1 illustrated in FIG. 23 includes the first bent waveguide 2A1, the second bent waveguide 2A2, a third bent waveguide 2A3, and a fourth bent waveguide 2A4.

The first bent waveguide 2A1 includes a curve that is curved to the right side of the travelling direction of light. The second bent waveguide 2A2 includes a curve that is curved to the left side of the travelling direction of the light. The third bent waveguide 2A3 includes a curve that is curved to the right side of the travelling direction of the light. The fourth bent waveguide 2A4 includes a curve that is curved to the right side of the travelling direction of the light.

The substrate type optical waveguide element 1J1 includes a first outer side slab 3B21 that is arranged at the outer circumferential portion of the first bent waveguide 2A1, that is, arranged on the left side of the travelling direction of light, and a first excess slab 11A21 that is arranged on the first outer side slab 3B21. The substrate type optical waveguide element 1J1 includes a first inner part slab 3A21 that is arranged at the inner circumferential portion of the first bent waveguide 2A1, that is, arranged on the right side of the travelling direction of light. The substrate type optical waveguide element 1J1 includes a second outer side slab 3B22 that is arranged at the outer circumferential portion of the second bent waveguide 2A2, that is, arranged on the right side of the travelling direction of light, and a second excess slab 11A22 that is arranged on the second outer side slab 3B22. The substrate type optical waveguide element 1J1 includes a second inner part slab 3A22 that is arranged at the inner circumferential portion of the second bent waveguide 2A2, that is, the left side of the travelling direction of light.

The substrate type optical waveguide element 1J1 includes a third outer side slab 3B23 that is arranged at the outer circumferential portion of the third bent waveguide 2A3, that is, arranged on the right side of the travelling direction of light, and the third excess slab 11A23 that is arranged on the third outer side slab 3B23. The substrate type optical waveguide element 1J1 includes a third inner part slab 3A23 that is arranged at the inner circumferential portion of the third bent waveguide 2A3, that is, arranged on the left side of the travelling direction of light. The substrate type optical waveguide element 1J1 includes a fourth outer side slab 3B24 that is arranged at the outer circumferential portion of the fourth bent waveguide 2A4, that is, arranged on the left side of the travelling direction of light, and a fourth excess slab 11A24 that is arranged on the fourth outer side slab 3B24. The substrate type optical waveguide element 1J1 includes a fourth inner part slab 3A24 that is arranged at the inner circumferential portion of the fourth bent waveguide 2A4, that is, arranged on the right side of the travelling direction of light.

An S-shaped bent waveguide is connected by connecting between the first bent waveguide 2A1 and the second bent waveguide 2A2, by connecting between the second bent waveguide 2A2 and the third bent waveguide 2A3, and by connecting between the third bent waveguide 2A3 and the fourth bent waveguide 2A4. The substrate type optical waveguide element 1J1 includes a first absorbing portion 15A12 that absorbs the unneeded mode located in the electric field that is present on the left side of the S-shaped bent waveguide, and a second absorbing portion 15A13 that absorbs the unneeded mode located in the electric field that is present on the right side of the S-shaped bent waveguide.

The first absorbing portion 15A12 is arranged on the slab ends of the first excess slab 11A21, the second inner part slab 3A22, the third inner part slab 3A23, and the fourth excess slab 11A24 that are arranged on the left side of the travelling direction of light. Furthermore, the second absorbing portion 15A13 is arranged on the right side of the travelling direction of light and is arranged on the slab ends of the second excess slab 11A22, the third excess slab 11A23, and the fourth inner part slab 3A24.

In other words, the first excess slab 11A21, the fourth excess slab 11A24, and the first absorbing portion 15A12 radiate and absorb the unneeded mode located in the electric field that is present on the left side of the travelling direction of light passing through the bent waveguide. Furthermore, the second excess slab 11A22, the third excess slab 11A23, and the second absorbing portion 15A13 radiate and absorbs the unneeded mode located in the electric field that is present on the right side of the travelling direction of light passing through the bent waveguide.

The substrate type optical waveguide element 1J1 absorbs the unneeded mode located in the electric fields that are present on the both sides of the bent waveguide. Consequently, it is possible to prevent recoupling of light in the unneeded mode and the main signal mode by suppressing the unneeded mode from travelling through the bent waveguide in the waveguide traveling direction.

In addition, a case has been described as an example in which the substrate type optical waveguide element 1J1 illustrated in FIG. 23 includes the four bent waveguides; however, the number of bent waveguides is not limited to four, and appropriate modifications are possible.

(j) Tenth Embodiment

FIG. 24 is a schematic plan view illustrating one example of a configuration of a substrate type optical waveguide element 1K according to a tenth embodiment. In addition, by assigning the same reference numerals to components having the same configuration as those in the substrate type optical waveguide element 1F illustrated in FIG. 15, overlapped descriptions of the configuration and the operation thereof will be omitted. The substrate type optical waveguide element 1K illustrated in FIG. 24 is different from the substrate type optical waveguide element 1F illustrated in FIG. 15 in that the substrate type optical waveguide element 1K includes a first conversion portion 32A that is arranged at an input portion 20A of the bent waveguide 2 having the rib type, and a second conversion portion 32B that is arranged at the output portion 20B of the bent waveguide 2 having the rib type.

The first conversion portion 32A is connected to a channel waveguide 31A at the input portion 20A of the bent waveguide 2 having the rib type. The first conversion portion 32A is a tapered waveguide in which the slab width is gradually increased from the channel waveguide 31A toward the bent waveguide 2 having the rib type. Also, the second conversion portion 32B is connected to a channel waveguide 31B at the output portion 20B of the bent waveguide 2 located on the rib side. The second conversion portion 32B is a tapered waveguide in which the slab width is gradually decreased from the bent waveguide 2 located on the rib side toward the channel waveguide 31B.

The first conversion portion 32A and the second conversion portion 32B have a waveguide structure constituted such that the magnitude relationship between the effective refractive indices of TM0 and TE1 in the channel waveguide and the magnitude relationship between TM0 and TE1 in the rib type waveguide are inverted, and furthermore, the waveguide structure has a vertical asymmetric structure, so that a conversion structure that enables mode conversion is constituted. For example, when considering three modes of TE0, TE1, and TM0, the magnitude relationship of the effective refractive index in the channel waveguide having the waveguide width of 500 nm and the thickness of 220 nm is represented by TE0>TM0>TE1. The magnitude relationship among the effective refractive indices in the rib type waveguide with the waveguide width of 500 nm, the thickness of 220 nm, and the slab thickness of 90 nm is represented by TE0>TE1>TM0, and TM0 that has been input to the channel waveguide is converted to the TE0 mode in the rib waveguide.

The first conversion portion 32A converts TM0 received from the channel waveguide 31A to TE1. Then, if TE1 is input, the bent waveguide 2 having the rib type propagates TE1 as the unneeded mode through the excess slab 11A, and absorbs the unneeded mode at the absorbing portion 15. Furthermore, the bent waveguide 2 having the rib type is able to remove the unneeded mode of TE1. Then, in the second conversion portion 32B, an amount of TE1 that is input from the bent waveguide 2 is decreased, the second conversion portion 32B is able to remove TM0 propagating through the channel waveguide 31B that is connected at the output stage of the bent waveguide 2. Furthermore, the higher-order mode of TE1 propagating through the channel waveguide 31B is converted to the slab mode, and then, it is possible to remove the slab mode in a similar manner. Therefore, in the channel waveguide 31B that is connected in the output stage of the bent waveguide 2, it is possible to remove the unneeded mode.

(k) Eleventh Embodiment

FIG. 25A is a schematic plan view illustrating one example of a configuration of a substrate type optical waveguide element 1L according to an eleventh embodiment. In addition, by assigning the same reference numerals to components having the same configuration as those in the substrate type optical waveguide element 1A illustrated in FIG. 6, overlapped descriptions of the configuration and the operation thereof will be omitted. The substrate type optical waveguide element 1L illustrated in FIG. 25A is different from the substrate type optical waveguide element 1A illustrated in FIG. 6 in that the substrate type optical waveguide element 1L includes an excess slab 11B3 that is connected to the slab end of the excess slab 11A and that has a tapered structure, and a waveguide 11M that is connected to the excess slab 11B3. Furthermore, the substrate type optical waveguide element 1L also includes a photo diode (PD) 17 that is connected to the waveguide 11M, which is different from the substrate type optical waveguide element 1A.

The excess slab 11A propagates the unneeded mode of the slab mode that has been converted by the bent waveguide 2 in the horizontal direction. The excess slab 11B3 is a tapered waveguide in which the waveguide width is gradually decreased from the slab end of the excess slab 11A toward the waveguide 11M.

The waveguide 11M inputs the unneeded mode received from the excess slab 11B3 to the PD 17. Then, the PD 17 terminates the unneeded mode received from the waveguide 11M. Consequently, in addition to preventing the unneeded mode from propagating through the bent waveguide 2 having the rib type, reflection with respect to the input portion 20A is effectively reduced.

In addition, a case has been described as an example in which, in the substrate type optical waveguide element 1C2 illustrated in FIG. 11B, the absorber 12 that is arranged in the vicinity of the slab end of the excess slab 11B of the tapered waveguide is provided; however, the absorbing portion 15 may be arranged in the interior of the excess slab 11B, and appropriate modifications are possible. FIG. 25B is a schematic plan view illustrating one example of a configuration of a substrate type optical waveguide element 1C3 according to another form. In addition, by assigning the same reference numerals to components having the same configuration as those in the substrate type optical waveguide element 1C2 illustrated in FIG. 11B, overlapped descriptions of the configuration and the operation thereof will be omitted. The substrate type optical waveguide element 1C3 illustrated in FIG. 25B is constituted such that the absorbing portion 15 is arranged in the interior of the excess slab 11B.

In the substrate type optical waveguide element 1C3, the absorbing portion 15 has been arranged in the interior of the excess slab 11B, and also, the absorber 12 for light has been arranged in the vicinity of the slab end of the excess slab 11B, so that it is possible to suppress the effect of the unneeded mode radiated at the excess slab 11B with respect to another element.

In addition, in order to form the absorbing portion 15, a process for doping on Si and a process for forming metal or the like are needed, which needs cost and takes time. If these processes are omitted, a reduction in cost and generation time can be expected. However, to change the structure in accordance with whether or not the above described processes are needed, it takes time and cost to, for example, form a mask at each portion, or the like. In the substrate type optical waveguide element, of course the removing portion 4 and the absorbing portion 15 are used in combination, the absorber 12 may be arranged on the outside of the removing portion 4 instead of using the absorbing portion 15, and appropriate modifications are possible.

In addition, the substrate type optical waveguide element 1 according to the first to the eleventh embodiments is able to be provided in an optical communication apparatus 50 as a built-in element. FIG. 26 is a diagram illustrating one example of the optical communication apparatus 50 in which the substrate type optical waveguide element 1 according to the present embodiment has been installed as a built-in element. The optical communication apparatus 50 illustrated in FIG. 26 is connected to an optical fiber provided on the output side and an optical fiber provided on the input side. The optical communication apparatus 50 includes a digital signal processor (DSP) 51, a light source 52, an optical transmitter 53, and an optical receiver 54. The DSP 51 is an electrical component that performs digital signal processing. The DSP 51 performs a process of, for example, encoding transmission data or the like, generates an electrical signal including transmission data, and outputs the generated electrical signal to the optical transmitter 53. In addition, the DSP 51 acquires an electrical signal including reception data from the optical receiver 54, and obtains reception data by performing a process of, for example, decoding the acquired electrical signal.

The light source 52 includes, for example, a laser diode or the like, generates light at a predetermined wavelength, and supplies the generated light to the optical transmitter 53 and the optical receiver 54. The optical transmitter 53 is the substrate type optical waveguide element that modulates light supplied from the light source 52 by using the electrical signal that is output from the DSP 51, and that outputs the obtained transmission light to the optical fiber. The optical transmitter 53 generates transmission light by modulating, when the light supplied from the light source 52 propagates through the waveguide, the light by using the electrical signal that is input to the optical modulator.

The optical receiver 54 receives the optical signal from the optical fiber, and demodulates the reception light by using the light that is supplied from the light source 52. Then, the optical receiver 54 converts the demodulated reception light to an electrical signal, and outputs the converted electrical signal to the DSP 51. The optical transmitter 53 and the optical receiver 54 includes therein, as a built-in element, the substrate type optical waveguide element 1 that propagates light.

In the substrate type optical waveguide element 1 included in the optical communication apparatus 50, the unneeded mode of the slab mode converted in the bent waveguide 2 is removed at the excess slab 11, the absorbing portion 15, and the like. Consequently, it is possible to remove the unneeded mode by decreasing the propagation loss in the basic mode. Furthermore, it is possible to prevent the unneeded mode from propagating through the bent waveguide 2 having the rib type.

In addition, for convenience of description, another optical waveguide may be arranged between the bent waveguide and the removing portion. In addition, another optical waveguide may be arranged between the bent waveguide and the absorbing portion (absorber).

In addition, a case has been described as an example in which the removing portion included in the substrate type optical waveguide element 1 removes the unneeded mode that is present in the bent waveguide 2; however, the all amount of the unneeded mode that is present in the bent waveguide 2 may be removed, an amount of the unneeded mode that is present in the bent waveguide 2 may be reduced, and appropriate modifications are possible.

In addition, for convenience of description, the bent waveguide may be a planar lightwave circuit (PLC) in which both of the core and the clad are made of $SiO_2$, or may be an InP waveguide, a GaAs waveguide, a Silicon Nitride (SiN) waveguide, or a lithium niobate ($LiNbO_3$) waveguide, and appropriate modifications are possible. The bent waveguide may be a Si waveguide in which the core is made of Si or $Si_3N_4$, and the lower part clad may be made of $SiO_2$, and the upper part clad may be made of $SiO_2$, air, SiN, or the like, and appropriate modifications are possible. In a case of the Si waveguide or the SiN waveguide, a relative refractive index difference is large, so that light is strongly confined, and, as a result, it is possible to implement a bent waveguide having a low loss even if a radius R is small, and it is thus possible to reduce the size of the substrate type optical waveguide element.

According to an aspect of an embodiment, it is possible to provide a small sized substrate type optical waveguide element and the like capable of removing an unneeded mode by reducing a propagation loss in the basic mode.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A substrate type optical waveguide element comprising:

- a bent waveguide that guides a basic mode, that converts an unneeded mode other than the basic mode to a slab mode, and that is a rib type; and
- a removing portion that is arranged at an outer circumferential portion of the bent waveguide and that removes, from the bent waveguide, the slab mode converted in the bent waveguide, wherein the removing portion is provided on a slab that is arranged at the outer circumferential portion of the bent waveguide, and is constituted of an excess slab that is formed such that an angle of incidence that is an angle formed by an incident traveling direction, in which the unneeded mode leaking from a rib of the bent waveguide is incident on a slab end of the slab, and a normal line of the slab end is less than a critical angle that is a threshold in which total reflection occurs.

2. The substrate type optical waveguide element according to claim 1, wherein the bent waveguide is an optical waveguide that is parallel to an easement curve having a curvature that varies continuously, and that is a rib type.

3. The substrate type optical waveguide element according to claim 1, wherein the removing portion removes the slab mode from the bent waveguide by causing the slab mode converted in the bent waveguide to be optically transitioned and radiated from the bent waveguide.

4. The substrate type optical waveguide element according to claim 3, wherein the slab mode includes

- a first slab mode in which an unneeded mode guided from an input portion of the bent waveguide is converted in the bent waveguide, and
- a second slab mode in which an unneeded mode guided from an output portion of the bent waveguide is converted in the bent waveguide, and the removing portion includes

- a first radiation portion that radiates the first slab mode, and
- a second radiation portion that radiates the second slab mode.

5. The substrate type optical waveguide element according to claim 3, wherein a discontinuous point of light is arranged at an inner part slab by notching the inner part slab that is arranged at an inner circumferential portion of the bent waveguide.

6. The substrate type optical waveguide element according to claim 3, further including another waveguide that is arranged between the bent waveguide and the removing portion.

7. The substrate type optical waveguide element according to claim 1, wherein the removing portion is an absorbing portion that removes the slab mode from the bent waveguide by causing the slab mode converted in the bent waveguide to be optically transitioned and absorbed from the bent waveguide.

8. The substrate type optical waveguide element according to claim 7, wherein the absorbing portion is an absorber that is arranged in a vicinity of an outer side slab arranged at the outer circumferential portion of the bent waveguide and that absorbs the slab mode received from the bent waveguide.

9. The substrate type optical waveguide element according to claim 7, wherein the absorbing portion is constituted of an N doped slab that is a part of an area of a slab that is arranged at the outer circumferential portion of the bent waveguide, a P doped slab that is a part of an area of the slab that is arranged at the outer circumferential portion of the bent waveguide, a germanium material arranged on the slab, or a metal material arranged on the slab.

10. The substrate type optical waveguide element according to claim 7, further including an optical waveguide that is arranged between the bent waveguide and the absorbing portion.

11. The substrate type optical waveguide element according to claim 1, wherein the removing portion has a tapered shape in which a waveguide width of the excess slab is gradually decreased toward the slab end.

12. The substrate type optical waveguide element according to claim 1, further including an absorbing portion that is arranged in a vicinity of the removing portion and that absorbs the slab mode propagating through the excess slab.

13. The substrate type optical waveguide element according to claim 1, further including an absorbing portion that is arranged in an interior of the removing portion and that absorbs the slab mode propagating through the excess slab.

14. The substrate type optical waveguide element according to claim 1, further including:

a first conversion portion provided at an input portion of the bent waveguide; and a second conversion portion provided at an output portion of the bent waveguide, wherein the first conversion portion is a tapered waveguide that is connected to a first channel waveguide at the input portion of the bent waveguide and in which a slab width is increased from the first channel waveguide toward the bent waveguide, and the second conversion portion is a tapered waveguide that is connected to a second channel waveguide at the output portion of the bent waveguide and in which a slab width is decreased from the bent waveguide toward the second channel waveguide.

15. A substrate type optical waveguide element comprising:

a first bent waveguide that guides a basic mode, that converts an unneeded mode other than the basic mode to a slab mode, and that is a rib type;

a first radiation portion that is arranged at an outer circumferential portion of the first bent waveguide, and that removes the unneeded mode from the first bent waveguide by causing the slab mode converted in the first bent waveguide to be optically transitioned and radiated from the first bent waveguide;

a first absorbing portion that is arranged in a vicinity of the first radiation portion and that absorbs the slab mode radiated at the first radiation portion;

a second bent waveguide that guides the basic mode, that converts the unneeded mode other than the basic mode to the slab mode, and that is the rib type;

a second radiation portion that is arranged at an outer circumferential portion of the second bent waveguide, and that removes the unneeded mode from the second bent waveguide by causing the slab mode converted in the second bent waveguide to be optically transitioned and radiated from the second bent waveguide; and a second absorbing portion that is arranged in a vicinity of the second radiation portion, and that absorbs the slab mode radiated at the second radiation portion, wherein a bend direction of each of the first bent waveguide and the second bent waveguide is opposite direction of a travelling direction of light, and an S-shaped bent waveguide is formed by connecting the first bent waveguide and the second bent waveguide.

16. An optical communication apparatus comprising:

a light source;

an optical transmitter that optically modulates light received from the light source and that transmits transmission light by using a transmission signal;

an optical receiver that receives a reception signal from reception light by using the light received from the light source; and a substrate type optical waveguide element that guides the light in the optical transmitter and the optical receiver, wherein the substrate type optical waveguide element includes a bent waveguide that guides a basic mode, that converts an unneeded mode other than the basic mode to a slab mode, and that is a rib type, and a removing portion that is arranged at an outer circumferential portion of the bent waveguide, and that removes the slab mode converted in the bent waveguide from the bent waveguide, the removing portion being provided on a slab that is arranged at the outer circumferential portion of the bent waveguide, and being constituted of an excess slab that is formed such that an angle of incidence that is an angle formed by an incident traveling direction, in which the unneeded mode leaking from a rib of the bent waveguide is incident on a slab end of the slab, and a normal line of the slab end is less than a critical angle that is a threshold in which total reflection occurs.

* * * * *